(12) United States Patent
Kang et al.

(10) Patent No.: US 11,855,518 B2
(45) Date of Patent: Dec. 26, 2023

(54) ELECTRICAL AND MECHANICAL CONNECTION STRUCTURE FOR MOTOR ASSEMBLY USED FOR DRIVING AN IMPELLER

(71) Applicant: LG Electronics Inc., Seoul (KR)

(72) Inventors: Joohang Kang, Seoul (KR); Junggu Lee, Seoul (KR); Yongdae Kim, Seoul (KR); Jin Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 17/390,329

(22) Filed: Jul. 30, 2021

(65) Prior Publication Data

US 2022/0131439 A1 Apr. 28, 2022

(30) Foreign Application Priority Data

Oct. 22, 2020 (KR) .................. 10-2020-0137693

(51) Int. Cl.
*H02K 5/24* (2006.01)
*H02K 7/08* (2006.01)
*H02K 9/06* (2006.01)

(52) U.S. Cl.
CPC .............. *H02K 5/24* (2013.01); *H02K 7/083* (2013.01); *H02K 9/06* (2013.01)

(58) Field of Classification Search
CPC ............ H02K 5/24; H02K 7/083; H02K 9/06; H02K 5/207; H02K 7/145; H02K 5/16; H02K 2203/09; H02K 13/02; H02K 1/14; H02K 1/22; H02K 7/003; H02K 7/14
See application file for complete search history.

(56) References Cited

U.S. PATENT DOCUMENTS

| 4,934,041 | A | 6/1990 | Hoover et al. |
| 2009/0026859 | A1 | 1/2009 | Kinoshita et al. |
| 2017/0005535 | A1 | 1/2017 | Gervais et al. |
| 2018/0140145 | A1* | 5/2018 | Hayamitsu .......... F04D 25/0606 |
| 2018/0219436 | A1 | 8/2018 | Shiozawa et al. |
| 2018/0363679 | A1* | 12/2018 | Johnson ................. H02K 5/207 |

FOREIGN PATENT DOCUMENTS

| EP | 3376043 | | 9/2018 |
| JP | 2015133772 | | 7/2015 |
| JP | 2015133772 | A * | 7/2015 |
| KR | 20090097039 | | 9/2009 |
| TW | 201947120 | | 12/2019 |

OTHER PUBLICATIONS

Extended European Search Report in European Appln. No. 21190775.3, dated Jan. 28, 2022, 7 pages.
Office Action in Taiwanese Appln. No. 110124993, dated May 12, 2022, 10 pages (with English translation).

* cited by examiner

*Primary Examiner* — Christopher M Koehler
*Assistant Examiner* — Viswanathan Subramanian
(74) *Attorney, Agent, or Firm* — Fish & Richardson P.C.

(57) ABSTRACT

An electric motor assembly includes a housing, an impeller disposed inside the housing, a stator disposed at one side of the impeller in an axial direction of the impeller, the stator comprising a plurality of coil parts, a rotor that includes a rotation shaft connected to the impeller and that is configured to rotate relative to the stator, a bracket that is coupled to the housing and supports the rotation shaft, and a connection ring that electrically connects together end portions of the plurality of coil parts.

15 Claims, 26 Drawing Sheets

ELECTRICAL AND MECHANICAL CONNECTION STRUCTURE FOR MOTOR ASSEMBLY USED FOR DRIVING AN IMPELLER

CROSS-REFERENCE TO RELATED APPLICATION

Pursuant to 35 U.S.C. § 119(a), this application claims the benefit of the earlier filing date and the right of priority to Korean Patent Application No. 10-2020-0137693, filed on Oct. 22, 2020, the contents of which are incorporated by reference herein in their entirety.

TECHNICAL FIELD

The present disclosure relates to an electric motor assembly.

BACKGROUND

A motor (e.g., an electric motor) is a device that can convert electrical energy into mechanical energy. For example, a motor may be applied to a hand-held device that a user holds with a hand to use, for example, such as a hair dryer or a cleaner. The motor may be designed to have a reduce size and weight for convenience of the user.

In some cases, the motor of the hand-held device may be configured as an electric motor assembly by including an impeller.

For example, the electric motor assembly of the hand-held device may be manufactured with a reduced size and weight in consideration of the convenience of use, and a high-speed operation of a rotor of the electric motor assembly rotates at a relatively high speed may help to maintain the same air volume and/or wind pressure.

In addition, the electric motor assembly of the hand-held device may be susceptible to an increase in vibration during the high-speed operation and noise generation due to the increase in the vibration.

For instance, when the size of the electric motor assembly (stator and rotor) is significantly reduced, a gap between teeth of the stator core and a neutral line connection part (or a gap between teeth of the stator core and a power line connection part) may be reduced in proportion to the size reduction, which may make it difficult to wind the stator coil. This causes a limit to reducing the size of the electric motor assembly.

In consideration of this, some electric motor assemblies are configured as electric motor assemblies having a split core which is manufactured by dividing a stator core into a yoke part and a plurality of tooth-parts, and use a method of coupling the plurality of tooth-parts to the yoke part after winding the stator coil around the plurality of tooth-parts.

In some cases, an electric motor assembly having the split core may have power lines and neutral lines of the stator coil including a plurality of coil parts spaced apart along a circumferential direction. The power lines and neutral lines may be disposed on a flow path of air which moves during rotation of an impeller, which may cause an increase in flow resistance of the air.

In some cases, the power lines and the neutral lines of the stator coil may be disposed on the flow path of the air that flows during the rotation of the impeller, and thus noise increases due to contact with the flowing air.

In some cases, electric motor assemblies having the split core may include a plurality of coil parts, where each of the plurality of coil parts is configured such that one end portion (power line) is connected to a power line connection part formed on a tooth insulator for insulating teeth and another end portion (neutral line) is connected to a neutral line connection part formed on a yoke insulator for insulating a yoke. In this structure, the neutral line of each of the plurality of oil parts may extend in the circumferential direction to be connected to the neutral line connection part after the plurality of teeth is coupled to the yoke. This may cause a difficulty in connecting the neutral line.

In some cases, in the electric motor assembly having the split core, since the neutral line connection part protrudes in an axial direction between the power line connection parts, a significant gap may not be secured between the power line connection part and the neutral line connection part, which causes a difficulty in dissipating heat from an inner space of the power line connection part and the neutral line connection part. Due to this, a temperature may increase in the inner space of the power line connection part and the neutral line connection part.

In some cases, in the electric motor assembly having the split core, in a state in which one end portion (neutral line) of each coil part of the stator coil is inserted into the neutral line connection part for the connection of the neutral line, a neutral line connection conductor is inserted into the neutral line connection part such that the one end portion of the coil part is inserted (press-fitted) into a slit of the neutral line connection conductor, which may make the connection of the neutral line unstable.

In some cases, in the art electric motor assembly, a slot may be formed through a frame in a radial direction, and a stator assembly may be inserted into the slot of the frame in the radial direction, which may increase a deviation of an air gap formed between an inner end portion of the stator (stator core) and a rotor. In some cases, an electromagnetic force acting between the stator and the rotor may be unbalanced to cause vibration and noise. Also, an output of the electric motor assembly may be lowered due to the unbalanced electromagnetic force.

In some cases, bearing accommodating portions may be integrally formed in both sides of the frame and spaced apart from each other, which may make it difficult to couple the frame, an impeller, bearings, and the rotor.

SUMMARY

The present disclosure describes an electric motor assembly in which the connection of neutral lines can be made quickly and easily.

The present disclosure also describes an electric motor assembly that can reduce or suppress an increase in flow resistance of air moved by an impeller.

The present disclosure further describes an electric motor assembly that can increase heat dissipation of a stator coil.

The present disclosure further describes an electric motor assembly that can stably connect neutral lines and increasing rigidity of a component.

The present disclosure further describes an electric motor assembly that can reduce or suppress an occurrence of forced wear of a bearing by improving concentricity of the bearing and a bearing accommodating portion.

According to one aspect of the subject matter described in this application, an electric motor assembly includes a housing, an impeller disposed inside the housing, a stator disposed at one side of the impeller in an axial direction of the impeller, the stator comprising a plurality of coil parts, a rotor that includes a rotation shaft connected to the impeller and that is configured to rotate relative to the stator, a bracket that is coupled to the housing and supports the rotation shaft, and a connection ring that electrically connects together end portions of the plurality of coil parts.

Implementations according to this aspect can include one or more of the following features. For example, the bracket can have a passing area configured to allow air to pass therethrough during rotation of the impeller and a non-passing area configured to block the air, where the connection ring is disposed at the non-passing area of the bracket, and the bracket and the connection ring are arranged along a moving direction of the air.

In some implementations, the electric motor assembly can include a bearing that is disposed at the bracket and supports the rotation shaft. In some examples, the connection ring can include a circular conductor and a plurality of linear conductors that extend from an outer surface of the circular conductor in a radial direction and are connected to the plurality of coil parts, where each of the plurality of linear conductors has a first side connected to the circular conductor and a second side connected to one of the plurality of coil parts. The circular conductor can be disposed at a center of the plurality of linear conductors.

In some examples, the bracket can include a bearing accommodating portion that receives the bearing, where the circular conductor is disposed at the bearing accommodating portion, and a plurality of spoke portions that are radially connected to an outer surface of the bearing accommodating portion, where the plurality of linear conductors are disposed at the plurality of spoke portions, respectively. In some examples, the bracket can include fixing member coupling portions coupled to fixing members in the axial direction, where each of the plurality of linear conductors defines a fixing member insertion portion that receives one of the fixing members.

In some implementations, the connection ring can include a circular conductor and a plurality of linear conductors that are connected to an inner surface of the circular conductor, where each of the plurality of linear conductors has a first side connected to the circular conductor and a second side connected to one of the plurality of coil parts, and the circular conductor is disposed at outer sides of the plurality of linear conductors. In some examples, the bracket can include a bearing accommodating portion that receives the bearing, a plurality of spoke portions that extend from an outer surface of the bearing accommodating portion in a radial direction, where the plurality of linear conductors are disposed at the plurality of spoke portions, respectively, and a rim that connects end portions of the plurality of spoke portions, where the circular conductor is disposed at the rim.

In some examples, the bracket can define fixing member coupling portions coupled to fixing members, and the connection ring can define fixing member insertion portions at boundary areas between the circular conductor and the plurality of linear conductors, where each of the fixing member insertion portions faces one of the fixing member coupling portions.

In some implementations, the connection ring can include an inner circular conductor, an outer circular conductor that is concentric with the inner circular conductor and spaced apart from the inner circular conductor in a radial direction, a plurality of linear conductors that radially extend from the inner circular conductor and are connected to the outer circular conductor, where each of plurality of linear conductors has a first side connected to the inner circular conductor or the outer circular conductor and a second side connected to one of the plurality of coil parts. The bracket can include a bearing accommodating portion that receives the bearing, where the inner circular conductor is disposed at the bearing accommodating portion, a plurality of spoke portions that extend in the radial direction from an outer surface of the bearing accommodating portion, and a rim that connects together end portions of the plurality of spoke portions, where the outer circular conductor is disposed at the rim.

In some examples, the bracket can define fixing member coupling portions coupled to fixing members and defined at boundary areas between the rim and the plurality of spoke portions of the bracket. The connection ring can define fixing member inserting portions at boundary areas between the outer circular conductor and the plurality of linear conductors, where each of the fixing member inserting portions faces one of the fixing member coupling portions.

In some implementations, the connection ring can include a circular conductor, a plurality of linear conductors that connect the circular conductor to the plurality of coil parts, where each of the plurality of linear conductors has a first side connected to the circular conductor and a second side connected to one of the plurality of coil parts, and connection pins that protrude from the plurality of linear conductors in the axial direction, respectively. In some examples, the stator can include a stator core, a stator coil that is wound around the stator core and includes the plurality of coil parts, and an insulator disposed between the stator core and the stator coil. The insulator can include a plurality of neutral line connection parts, where each of the plurality of neutral line connection parts is connected to one of the end portions of the plurality of coil parts and coupled to one of the connection pins.

In some examples, each of the plurality of neutral line connection parts can include a neutral line connection conductor that defines a connection pin accommodating portion having an arcuate shape with one open side, where the neutral line connection conductor is in contact with one of the connection pins.

In some implementations, the connection ring can include a circular conductor, a plurality of linear conductors that connect the circular conductor to the plurality of coil parts, where each of the plurality of linear conductors has a first side connected to the circular conductor and a second side connected to one of the plurality of coil parts, and bent connection pins that are bent from ends of the plurality of linear conductors in the axial direction, respectively, where each of the bent connection pins is connected to one of the plurality of coil parts. In some examples, the stator can include a stator core, a stator coil that is wound around the stator core and includes the plurality of coil parts, and an insulator disposed between the stator core and the stator coil. The insulator can include a plurality of neutral line connection parts, where each of the plurality of neutral line connection parts is connected to one of the end portions of the plurality of coil parts and coupled to one of the bent connection pins.

In some examples, each of the neutral line connection parts can include a neutral line connection conductor that connects one of the bent connection pins to one of the end portions of the plurality of coil parts. The neutral line connection conductor can include a body having side wall portions that extend parallel to each other and receive a bent connection pin among the bent connection pins, and a pressing portion disposed at one of the side wall portions of the body and configured to press the bent connection pin inserted between the side wall portions to thereby bring the bent connection pin in contact with the other of the side wall portions of the body.

In some examples, the pressing portion can extend from one of the side wall portions toward the other of the side wall portions and is inclined with respect to an insertion direction of the bent connection pin, where the bent connection pin can include a stop portion that is in contact with the pressing portion and configured to restrict separation of the bent connection pin from the neutral line connection conductor.

In some implementations, the bracket can define a connection ring accommodating portion that is recessed in the axial direction and receives the connection ring. In some implementations, the bracket can be made of an injection molding material applied after the connection ring is inserted into a mold.

In some implementations, the electric motor assembly can include neutral lines of a plurality of coil parts of a stator coil that are connected together by a connection ring configured as an electrical conductor. This can allow the neutral lines of the plurality of coil parts of the stator coil to be connected quickly and easily.

In some implementations, a connection ring can connect one end portion (neutral line) of each of the plurality of coil parts of the stator coil, where the connection ring can have a non-passing area through which air moved by an impeller does not pass. This can result in preventing an increase in flow resistance of the air due to the connection ring.

For example, an impeller and a stator can be spaced apart from each other in an axial direction. A bracket for supporting a rotation shaft connected to the impeller can be provided between the impeller and the stator. The bracket can have a passing area through which air moved during rotation of the impeller passes and a non-passing area through which the air does not pass. The connection ring which connects one end portion of each of a plurality of coil parts of the stator can be provided in the non-passing area of the bracket, thereby preventing an increase in flow resistance of the air due to the connection ring.

In addition, noise generation due to vibration of the connection ring when the air is in contact with the connection ring can be prevented or reduced.

In some implementations, the impeller and the stator can be accommodated in a housing. The bracket can include a bearing for rotatably supporting the rotation shaft, and can be coupled to one end portion of the housing after the stator is inserted into the housing.

For example, the electric motor assembly can include a housing, an impeller provided inside the housing, a stator provided at one side of the impeller and having a plurality of coil parts, a rotor having a rotation shaft connected to the impeller and disposed to be rotatable relative to the stator, a bracket coupled to the housing to support the rotation shaft, and a connection ring configured as an electric conductor and electrically connecting one end portion of each of the plurality of coil parts at the same time. This can allow neutral lines of the plurality of coil parts of the stator coil to be connected quickly and easily.

In some implementations, the stator can include a stator core and a stator coil wound around the stator core. The stator core can include a yoke in a ring shape and a plurality of teeth coupled to the yoke to be disposed in a radial direction. The stator coil can include a plurality of coil parts wound around the plurality of teeth in a concentrated winding manner.

In some implementations, the plurality of coil parts can be wound around the plurality of teeth, respectively, before the plurality of teeth is coupled to the yoke, and thus it may be unnecessary to secure a gap between the plurality of teeth for the winding of the plurality of coil parts. Accordingly, an outer diameter of the yoke of the stator can be further reduced, thereby providing an electric motor assembly which can become very compact.

In some implementations, the bracket can have a passing area through which air moved during rotation of the impeller passes and a non-passing area through which the air does not pass. The connection ring can be disposed in the non-passing area of the bracket in a moving direction of the air moved during the rotation of the impeller. This can help to reduce or prevent an increase in flow resistance of the air due to the connection ring.

In some implementations, the connection ring can include a circular conductor formed in a circular shape, and a plurality of linear conductors each having one side connected to the circular conductor and another side connected to the corresponding coil part. Accordingly, end portions (neutral lines) of the plurality of coil parts can be electrically connected together at the same time.

In some implementations, the circular conductor can be disposed at a center of the plurality of linear conductors, and one area of each of the plurality of linear conductors can be electrically connected to an outer surface of the circular conductor in a radial direction.

In some implementations, the bracket can include a bearing accommodating portion in which a bearing is accommodated, and a plurality of spoke portions radially connected to an outer surface of the bearing accommodating portion and spaced apart in a circumferential direction. The bracket can include a rim formed in a ring shape to connect outer end portions of the plurality of spoke portions.

In some examples, a housing coupling portion can protrude from one side of the rim in the axial direction. The housing can include an insertion portion inserted into the housing coupling portion. The insertion portion can have an outer diameter reduced in a radial direction and extend in a circumferential direction.

Accordingly, the housing (insertion portion) and the bracket (housing coupling portion) can be concentrically coupled to each other.

In some examples, the bracket coupled to the housing and the bearing coupled to the bracket can be concentrically disposed with each other, thereby preventing the bearing from being forcibly worn due to eccentricity of the bearing.

This can result in expanding a useful life of the bearing.

In some examples, a non-passing area through which air does not pass can be defined at one side of the bearing accommodating portion and the plurality of spoke portions in the axial direction, and a passing area through which air passes can be defined between the plurality of spoke portions spaced apart from each other in the circumferential direction.

The circular conductor can be disposed in the bearing accommodating portion and the plurality of linear conductors can be disposed on the plurality of spoke portions.

Accordingly, the circular conductor and the plurality of linear conductors can be prevented from being brought into contact with air moved during the rotation of the impeller.

In some implementations, the bracket can include fixing member coupling portions defined therethrough such that fixing members are coupled in the axial direction.

The plurality of linear conductors can include fixing member inserting portions formed therethrough, respectively, such that the fixing members can be inserted.

In some examples, the circular conductor of the connection ring can be brought into close contact with the bearing accommodating portion of the bracket and the plurality of linear conductors can be brought into close contact with the plurality of spoke portions, respectively, such that the bracket can be supported by the connection ring, which can result in preventing deformation of the bracket.

In some implementations, the circular conductor can be disposed at an outer side of the plurality of linear conductors, and the plurality of linear conductors can be electrically connected to an inner surface of the circular conductor.

In some implementations, the bracket can include a bearing accommodating portion in which the bearing is accommodated, a plurality of spoke portions extending in a radial direction from an outer surface of the bearing accommodating portion, and a rim connecting end portions of the plurality of spoke portions.

The circular conductor can be disposed on the rim and the plurality of linear conductors can be disposed on the plurality of spoke portions.

Accordingly, the rigidity (supporting strength) of the bracket can be increased by the circular conductor and the plurality of linear conductors of the connection ring.

In some examples, an occurrence of displacement of the bearing provided in the bracket can be suppressed and forcible wear of the bearing due to the displacement of the bearing can be prevented.

In some implementations, the bracket can include fixing member coupling portions defined therethrough such that fixing members are coupled in the axial direction.

Fixing member inserting portions can be defined in boundary areas between the circular conductor and the plurality of linear conductors to communicate with the fixing member coupling portions, respectively.

In some implementations, the circular conductor can include an inner circular conductor and an outer circular conductor that are concentrically arranged with each other, and the plurality of linear conductors can be disposed along a radial direction to connect the inner circular conductor and the outer circular conductor.

The bracket can include a bearing accommodating portion in which the bearing is accommodated, a plurality of spoke portions extending in a radial direction from an outer surface of the bearing accommodating portion, and a rim connecting end portions of the plurality of spoke portions. The inner circular conductor can be disposed in the bearing accommodating portion and the outer circular conductor can be disposed on the rim. Accordingly, the rigidity (supporting strength) of the bracket can be increased by the inner circular conductor, the outer circular conductor, and the plurality of linear conductors of the connection ring.

In some examples, when the bracket maintains the same rigidity (supporting strength), an amount of materials to be used for manufacturing the bearing accommodating portion, the spoke portions, and the rim of the bracket can be reduced as much as the supporting strength being increased by the connection ring.

In some implementations, fixing member coupling portions to which fixing members are coupled can be provided in boundary areas between the rim of the bracket and the plurality of spoke portions. Fixing member inserting portions can be defined in boundary areas between the outer circular conductor and the plurality of linear conductors to communicate with the fixing member coupling portions, respectively. Accordingly, the bracket and the connection ring can be integrally fixedly by the fixing members.

In some implementations, each of the plurality of linear conductors can include a connection pin protruding in the axial direction. This configuration can facilitate the connection of the stator coil and the connection ring. For example, the connection pin can have a cylindrical shape. One end portion of the connection pin can be coupled to the linear conductor. The connection pin can be welded to the linear conductor.

In some implementations, the stator can include a stator core, a stator coil having the plurality of coil parts wound around the stator core, and an insulator interposed between the stator core and the stator coil. The insulator can include a plurality of neutral line connection parts each connected with one end portion of the corresponding coil part and coupled with the connection pin. This configuration can facilitate the connection of the plurality of coil parts of the stator coil and the connection ring.

In some implementations, the plurality of neutral line connection parts can be spaced apart from one another by preset intervals in the circumferential direction. Accordingly, heat dissipation of an inner space of the plurality of neutral line connection parts can be facilitated.

In some implementations, each of the neutral line connection parts can include a neutral line connection conductor having a connection pin accommodating portion in an arcuate shape with one side open to be elastically brought into contact with the connection pin. Accordingly, one end portion (neutral line) of each of the plurality of coil parts of the stator coil can be quickly and easily connected to the connection pin of the connection ring.

In some examples, since the neutral line connection conductor and the connection pin can be elastically coupled to each other, an occurrence of contact failure between the neutral line connection conductor and the connection pin can be reduced or suppressed, and a close contact state between the neutral line connection conductor and the connection pin can be maintained stably.

In some implementations, the insulator can include a plurality of power line connection parts to which another end portion (power line) of each of the plurality of coil parts can be connected.

Each of the plurality of power line connection parts can be provided at one side of each of the neutral line connection parts.

The plurality of power line connection parts can be spaced apart from one another by preset intervals in the circumferential direction.

Accordingly, heat dissipation of an inner space of the plurality of neutral line connection parts and neutral line connection parts can be facilitated.

In some implementations, the plurality of power line connection parts can include printed circuit board (PCB) connection terminals, respectively, connected to a PCB. For example, the PCB can be provided on one side of the bracket in the axial direction. The bracket can be disposed between the stator and the PCB in the axial direction. In some examples, the stator can be inserted into the housing, the bracket can be coupled to an end portion of the housing, and the PCB can be coupled to the PCB connection terminal passing through the bracket.

In some implementations, each of the plurality of linear conductors can include a bent connection pin bent from one end portion in the axial direction to be connected to the corresponding coil part. In some examples, the bent connection pin can be easily defined on the linear conductor, thereby facilitating the manufacture of the connection ring.

The bent connection pin can include a neutral line insertion slot in which the neutral line of the coil part is inserted.

The stator can include a stator core, a stator coil having the plurality of coil parts wound around the stator core, and an insulator interposed between the stator core and the stator coil. The insulator can include a plurality of neutral line connection parts each connected with one end portion of the corresponding coil part and coupled with the bent connection pin.

Each of the neutral line connection parts can include a neutral line connection conductor connected to the bent connection pin and the one end portion of the coil part such that the bent connection pin and the one end portion of the coil part are electrically connected to each other.

The neutral line connection conductor can include a body having both side wall portions disposed in parallel such that the bent connection pin is inserted therebetween, and a pressing portion formed on one of the both side wall portions of the body to elastically press the bent connection pin such that the bent connection pin is brought into contact with another side wall portion of the body.

In some implementations, the pressing portion can be disposed to be inclined from one of the both side wall portions to another side wall portion in a direction in which the bent connection pin is inserted.

Accordingly, when the bent connection pin is inserted, the pressing portion can be pressed by the bent connection pin to be elastically open. When the bent connection pin is completely inserted, the pressing portion can press the bent connection pin by its own elastic force so that the bent connection pin can be brought into close contact with the side wall portion of the neutral line connection conductor.

In some implementations, the bent connection pin can include a stop portion that is brought into contact with the pressing portion to be locked in a direction in which the bent connection pin is separated. This structure can restrict the bent connection pin from being accidentally separated from the body after the complete insertion of the bent connection pin. For example, the stop portion can include a stopping groove recessed in a thickness direction of the bent connection pin. In some cases, the stopping groove can be provided in plurality, spaced apart in a direction in which the bent connection pin is inserted.

In some implementations, the stop portion can include a stopping jaw protruding in the thickness direction of the bent connection pin.

In some implementations, the bracket can include a connection ring accommodating portion recessed in the axial direction so that the connection ring can be inserted.

In some examples, when the bracket is coupled to the housing in a state in which the stator is inserted into the housing and the connection ring is coupled to the bracket, the connection ring can be naturally inserted into the neutral line connection parts of the stator. This can facilitate the connection of neutral lines of the stator coil.

Thus, a total number of assembly processes for the electric motor assembly can be reduced.

In some implementations, the bracket can be formed by injection molding after the connection ring is inserted into a mold. This can result in increasing a coupling force between the connection ring and the bracket and further increasing rigidity of the bracket.

In some examples, in the state that the stator is inserted in the housing, the bracket can be coupled to the housing and simultaneously the connection ring can be naturally coupled (connected) to the neutral line connection parts of the stator. This can result in reducing a total number of assembly processes for the electric motor assembly.

In some implementations, one end portion (neutral line) of each of a plurality of coil parts of a stator can be connected by a connection ring which is configured as an electric conductor, thereby easily and quickly connecting the neutral lines of a stator coil.

In some implementations, the connection ring that connects one end portion (neutral line) of each of the plurality of coil parts of the stator coil at the same time can be provided in a non-passing area of a bracket through which air moved by an impeller does not pass, resulting in preventing an increase in flow resistance of the air due to the installation of the connection ring.

In some implementations, a contact between the connection ring and the air moved by the rotation of the impeller can be suppressed, thereby preventing an occurrence of vibration of the connection ring and a generation of noise due to the vibration of the connection ring.

In some implementations, since the connection ring includes a circular conductor and a plurality of linear conductors, the connection ring can be easily installed at a downstream side of the non-passing area of the bracket through which the air does not pass during the rotation of the impeller.

In some implementations, since the circular conductor of the connection ring is disposed on a bearing portion of the bracket and the plurality of linear conductors of the connection ring is disposed on spoke portions of the bracket, the rigidity (supporting strength) of the bracket can be increased by the connection ring configured as a metal member. Accordingly, an occurrence of displacement of a bearing provided in the bracket can be suppressed and forcible wear of the bearing due to the displacement can be prevented.

In some implementations, since the circular conductor of the connection ring is disposed at an outer side of the plurality of linear conductors and the plurality of linear conductors is connected to an inner surface of the circular conductor, the connection ring can be easily installed at a downstream side of the non-passing area of the bracket through which the air moved during the rotation of the impeller does not pass.

In some implementations, the connection ring can include an inner circular conductor and an outer circular conductor, which are arranged concentrically with each other, and a plurality of linear conductors each having both end portions connected to the inner circular conductor and the outer circular conductor. Accordingly, a contact between the connection ring and the air can be suppressed and an increase in flow resistance of the air can be suppressed, thereby increasing the rigidity of the bracket.

The bracket can include a connection ring accommodating portion recessed so that the connection ring can be inserted in the axial direction. In some examples, the bracket and the connection ring can be easily coupled to each other and the rigidity of the bracket can be increased by the coupling between the connection ring and the bracket.

The bracket can be formed by injection molding after the connection ring is inserted into a mold. Therefore, the connection ring can be naturally coupled to the stator when coupling the bracket. This can result in reducing a total number of assembly processes for the electric motor assembly. The bracket can include a housing coupling portion protruding in the axial direction and the housing can include an insertion portion inserted into the housing coupling portion, so that the housing and the bracket can be concentrically coupled to each other.

In some implementations, since the bracket is provided with the housing coupling portion and the bearing accommodating portion which are arranged concentrically with each other, a bearing accommodated in the bearing accommodating portion can be concentrically disposed with respect to the housing when the bracket and the housing are coupled to each other.

DETAILED DESCRIPTION

Figure 1:
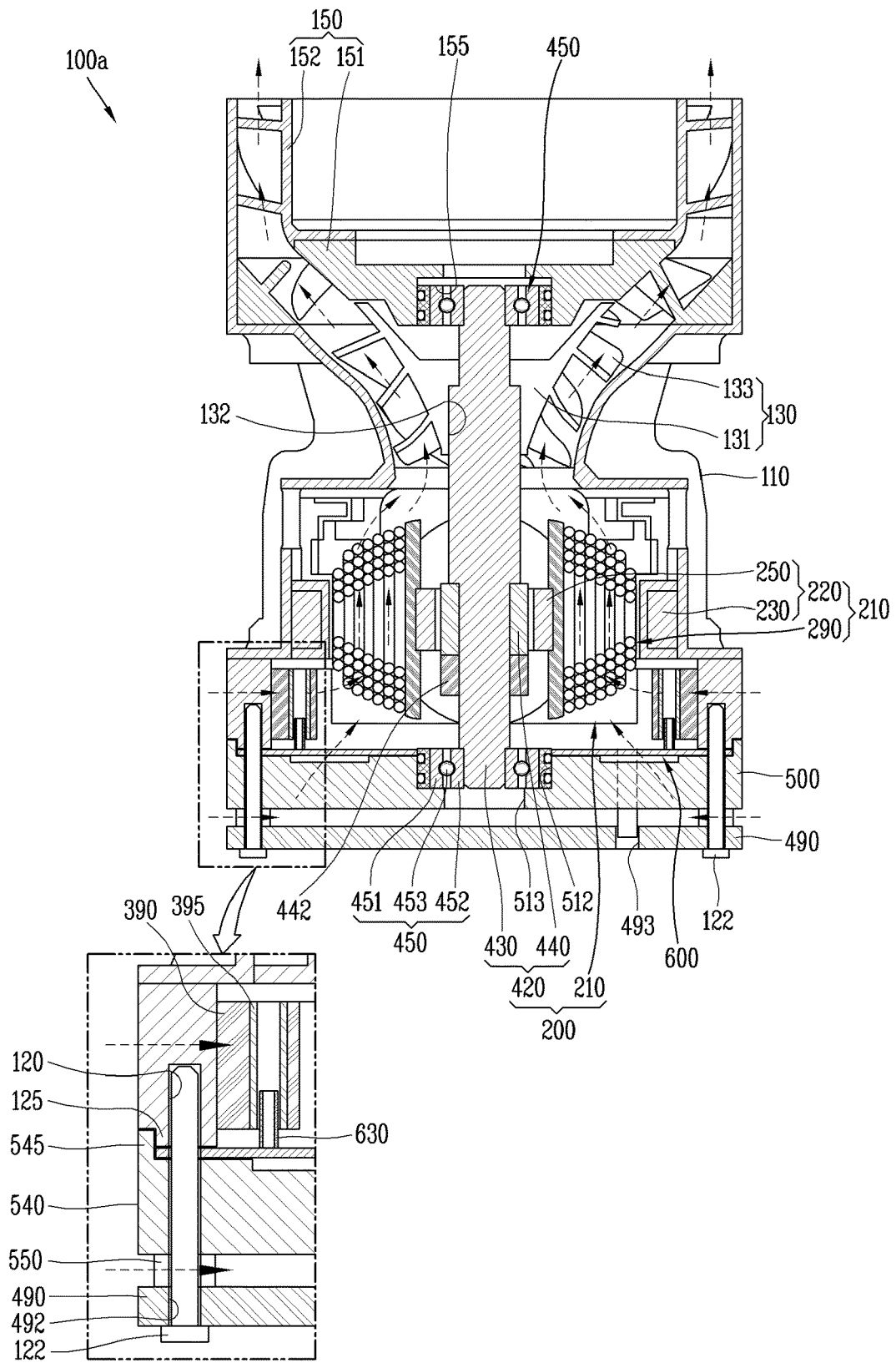
FIG. 1 is a cross-sectional view illustrating an example of an electric motor assembly.

Hereinafter, implementations of the present disclosure will be described in detail with reference to the accompanying drawings. For the sake of brief description with reference to the drawings, the same or equivalent components will include the same reference numerals, and description thereof will not be repeated. A singular representation used herein can include a plural representation unless it represents a definitely different meaning from the context. In describing the present disclosure, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 2:
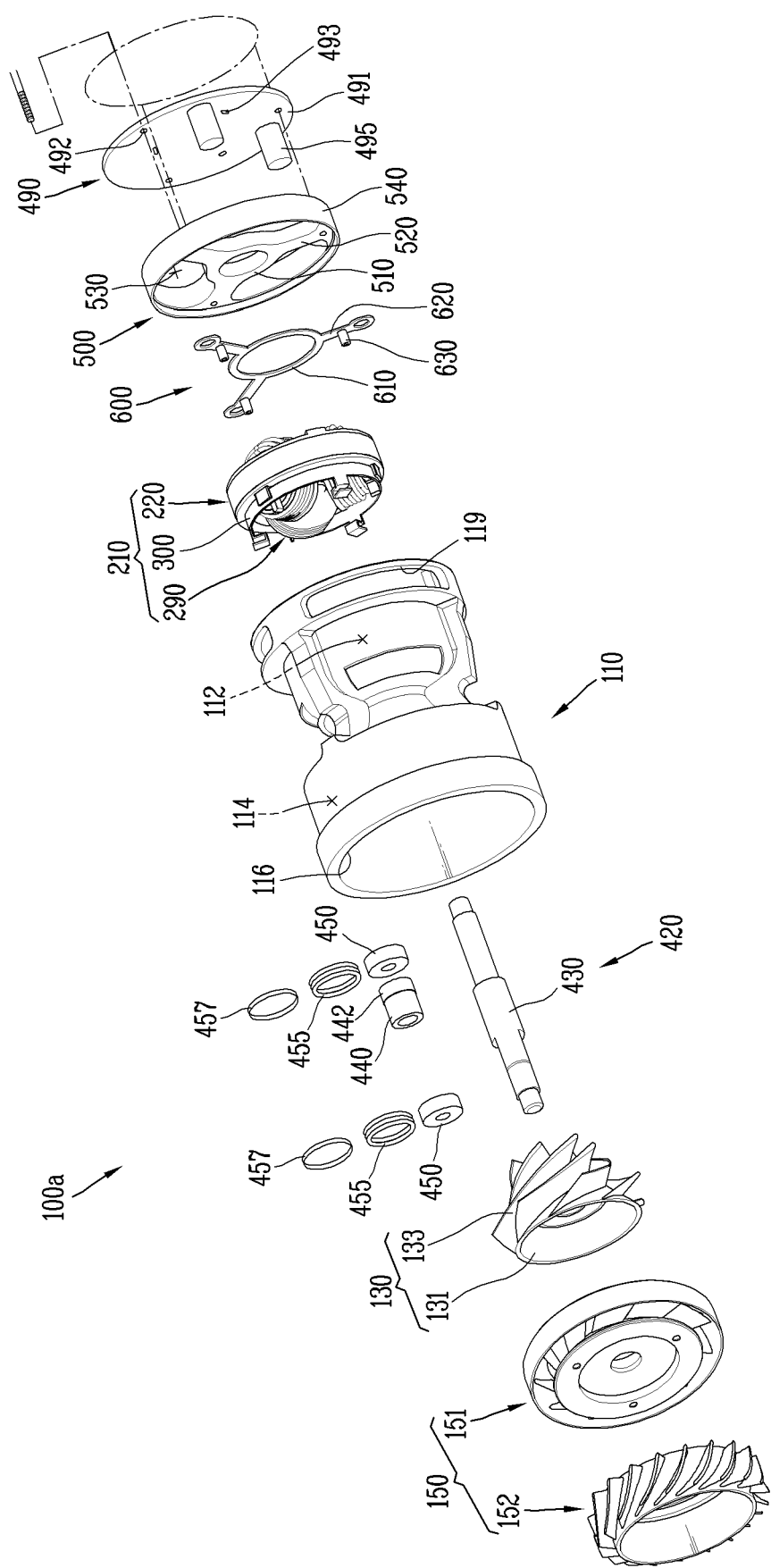
FIG. 2 is an exploded perspective view illustrating the electric motor assembly of FIG. 1.

FIG. 1 is a cross-sectional view illustrating an example of an electric motor assembly, and FIG. 2 is an exploded perspective view illustrating the electric motor assembly of FIG. 1. As illustrated in FIGS. 1 and 2, an electric motor assembly 100a can include a housing 110, an impeller 130, a stator 210, a rotor 420, a bracket 500, and a connection ring 600.

The housing 110 can be implemented in, for example, a cylindrical shape having an inner accommodation space.

A stator accommodation portion 112 in which the stator 210 is accommodated can be formed at one side (lower portion in the drawing) in the housing 110.

A plurality of suction holes 119 can be formed through the stator accommodating portion 112 such that air can be sucked into the stator accommodating portion 112.

An impeller accommodating portion 114 in which the impeller 130 is accommodated can be formed at another side (upper portion in the drawing) in the housing 110.

A guide vane accommodating portion 116 in which a guide vane 150 to be explained later is accommodated can be disposed on one side of the impeller accommodating portion 114 in the housing 110.

Accordingly, the housing 110 and the guide vane 150 can be concentrically coupled to each other.

An insertion portion 125 inserted into the bracket 500 can be formed in one end portion (lower end portion in the drawing) of the housing 110.

The insertion portion 125 can be cut out to have an outer diameter, which is reduced compared to an outer diameter of the housing 110, for example.

The impeller 130 can include a hub 131 and a plurality of blades 133 disposed along a circumference of the hub 131. The hub 131 can include a rotation shaft hole 132 to which a rotation shaft 430, which will be described later, can be coupled. The rotation shaft hole 132 can be formed through the hub 131 so that the rotation shaft 430 can be inserted in the axial direction.

The impeller 130 can be implemented as a mixed-flow impeller that sucks air in the axial direction and discharges it obliquely with respect to the axial direction.

The stator 210 can be located at an upstream side of the impeller 130 based on a moving direction of air that is moved when the impeller 130 rotates.

Accordingly, external air of the housing 110 having a relatively low temperature can be brought into contact with the stator 210, so as to facilitate cooling of the stator 210.

The impeller 130 can be located at a downstream side of the stator 210 based on the moving direction of the air that is moved when the impeller 130 rotates.

An impeller operating part 200 for rotating the impeller 130 can be provided at one side of the impeller 130.

The impeller operating part 200 can include, for example, a stator 210 and a rotor 420 disposed to be rotatable relative to the stator 210.

The stator 210, for example, can include a stator core 220, a stator coil 290 wound around the stator core 220, and an insulator provided between the stator core 220 and the stator coil 290.

The stator core 220 can include, for example, a yoke 230 and a plurality of teeth 250 spaced apart from one another along a circumferential direction of the yoke 230.

The plurality of teeth 250 can be, for example, 3 in number.

The stator coil 290 can include a plurality of coil parts 291 wound around the plurality of teeth 250 in a concentrated winding manner.

The yoke 230 and the plurality of teeth 250, for example, can be manufactured separately and then coupled to each other.

In some examples, since the plurality teeth 250 is coupled to the yoke 230 after the stator coil 290 is wound around the plurality of teeth 250, a gap may not be defined between adjacent teeth 250 of the plurality of teeth 250 for winding the stator coil 290. Accordingly, sizes of the yoke 230 and the plurality of teeth 250 can be more remarkably reduced, thereby providing an electric motor assembly which can be very compact.

The stator coil 290 can be configured to receive AC power of three phases.

The plurality of coil parts 291 can be provided by three in number.

The plurality of coil parts 291 can be connected to respective phases (U phase, V phase, W phase) of a three-phase AC power source.

The plurality of coil parts 291 can be connected to the respective phases (U phase, V phase, and W phase) of the three-phase AC power source at each one end portion, and electrically connected to the connection ring simultaneously at each another end portion.

In some implementations, the one end portion of each of the plurality of coil parts 291 connected to the power source can be referred to as a power line 293 and the another end portion connected to the connection ring 600 can be referred to as a neutral line 294.

The rotor 420 can be provided inside the stator 210.

The rotor 420 can be rotatably disposed inside the stator 210 with a preset air gap.

The rotor 420 can include, for example, a rotation shaft 430 and a permanent magnet 440 rotating centering around the rotation shaft 430.

The permanent magnet 440 can be configured such that different magnetic poles (N pole and S pole) are disposed along the circumferential direction.

The rotation shaft 430 can be implemented to extend to both sides of the permanent magnet 440 along the axial direction.

An end ring 442 can be provided on one side (lower side in the drawing) of the permanent magnet 440 along the axial direction. In some examples, the end ring 442 can be provided on one side of the permanent magnet 440, but this is merely illustrative. For instance, the end ring 442 can alternatively be disposed on each of both sides of the permanent magnet 440.

The impeller 130 can be coupled to one end portion (upper portion in the drawing) of the rotation shaft 430 and the permanent magnet 440 can be coupled to another end portion (lower portion in the drawing) of the rotation shaft 430.

The rotation shaft 430 can be rotatably supported by a plurality of bearings 450.

The plurality of bearings 450 can be, for example, provided by two in number.

The plurality of bearings 450 can be, for example, implemented as a ball bearing.

As is well known, the plurality of bearings 450 can include an outer ring 451, an inner ring 452 concentrically coupled to an inner side of the outer ring 451, and a plurality of balls 453 coupled between the outer ring 451 and the inner ring 452.

The plurality of bearings 450 can be disposed on both sides of the permanent magnet 440 along the axial direction.

Bearing holders 455 can be coupled to outer sides of the plurality of bearings 450, respectively.

In some implementations, sealing members 457 can be provided on outer surfaces of the bearing holders 455, respectively.

The sealing member 457 can be implemented as, for example, an O-ring.

A guide vane 150 for guiding air can be provided at a downstream side (upper side in the drawing) of the impeller 130 based on a flowing (moving) direction of air that flows during the rotation of the impeller 130.

The guide vane 150 can include, for example, a first guide vane 151 and a second guide vane 152 coupled to each other along the axial direction.

The first guide vane 151 can include a bearing accommodating portion 155 to accommodate one of the plurality of bearings 450.

An outer surface of the first guide vane 151 and the bearing accommodating portion 155 can be concentrically arranged with each other.

Accordingly, when the first guide vane 151 is coupled into the guide vane accommodating portion 116 of the housing 110, the bearing 450 accommodated in the bearing accommodating portion 155 can be concentrically disposed with respect to the housing 110.

The bracket 500 can be provided at an upstream side (lower side in the drawing) of the stator 210 along the flowing direction of air that flows during the rotation of the impeller 130.

Another bearing 450 of the plurality of bearings 450 can be provided in a center of the bracket 500.

The bracket 500 can include, for example, a bearing accommodating portion 510 in which the bearing 450 is accommodated, and a plurality of spoke portions 520 radially connected to an outer surface of the bearing accommodating portion 510.

The plurality of spoke portions 520 can be disposed to be spaced apart from one another along a circumferential direction of the bearing accommodating portion 510.

Through portions 530 to be described later can be formed between the plurality of spoke portions 520.

The plurality of spoke portions 520 can be, for example, three in number.

The bracket 500 can include, for example, a rim 540 connecting end portions (outer end portions) of the plurality of spoke portions 520.

The rim 540 can be implemented in a ring shape.

The rim 540 can be configured, for example, to be concentrically arranged with the bearing accommodating portion 510.

The implementation illustrates the case where the bracket 500 includes the rim 540 disposed on the end portions of the plurality of spoke portions 520 to be coupled to an end portion of the housing 110, but this is merely illustrative. Alternatively, the plurality of spoke portions 520 can be directly coupled to the end portion of the housing without the rim 540.

A printed circuit board (PCB) that is electrically connected to the stator coil 290 can be provided at one side (lower side in the drawing) of the bracket 500.

The PCB 490 can include, for example, a substrate 491 and a plurality of circuit parts 495 provided on the substrate 491.

The substrate 491, for example, can be formed in a shape of a circulate plate.

A plurality of fixing member inserting portions 492 into which fixing members 122 are inserted can be formed through the substrate 491, respectively. The plurality of fixing member inserting portions 492 can be formed through the substrate 491 to communicate with fixing member coupling portions which are formed at the housing 110 and the bracket 500, respectively.

The substrate 491 can include a plurality of PCB connection terminal inserting portions 493 through which PCB connection terminals 385 to be described later are coupled.

The PCB 490 can be disposed to be spaced apart from the bracket 500 at a predetermined distance along the axial direction.

Accordingly, a flow path (or movement path) of air can be defined between the bracket 500 and the PCB 490.

When the impeller 130 rotates, air can be sucked between the substrate 491 and the bracket 500, pass through the through portions 530 between the spoke portions 520 of the bracket 500, and flow toward the stator 210.

In some implementations, during the rotation of the impeller 130, a passing area A1 through which air passes and a non-passing area A2 through which the air does not pass can be formed in the bracket 500 along the flowing direction of the air.

The PCB 490 can include, for example, an electric circuit (e.g., inverter circuit) to apply three-phase AC power to the stator coil 290.

In some examples, a connection ring 600 which connects one end portion (neutral line 294) of each of the plurality of coil parts 291 of the stator coil 290 can be provided on one side (lower side in the drawing) of the stator 210 along the axial direction.

More specifically, the connection ring 600 for electrically connecting simultaneously the one end portion (neutral line 294) of each of the plurality of coil parts 291 of the stator coil 290 can be provided between the bracket 500 and the stator 210.

The connection ring 600 can be configured as an electric conductor.

The connection ring 600 can be made of, for example, copper (Cu) or a copper alloy.

The connection ring 600 can include, for example, a circular conductor 610 having a circular shape, and a plurality of linear conductors 620 each having one side connected to the circular conductor 610 and another side connected to the corresponding coil part 291 of the stator coil 290.

The connection ring 600 can be located at a downstream side of the bracket 500 in a moving direction of air that is moved during the rotation of the impeller 130.

The connection ring 600 can be disposed in the non-passing area, through which air does not pass, at the downstream side of the bracket 500.

This can prevent the contact between the air moved during the rotation of the impeller 130 and the connection ring 600, thereby suppressing an increase in flow resistance of the air due to the connection ring 600.

In addition, since the contact between the connection ring 600 and the air is prevented, an increase in noise due to vibration of the connection ring 600 can be suppressed.

Figure 3:
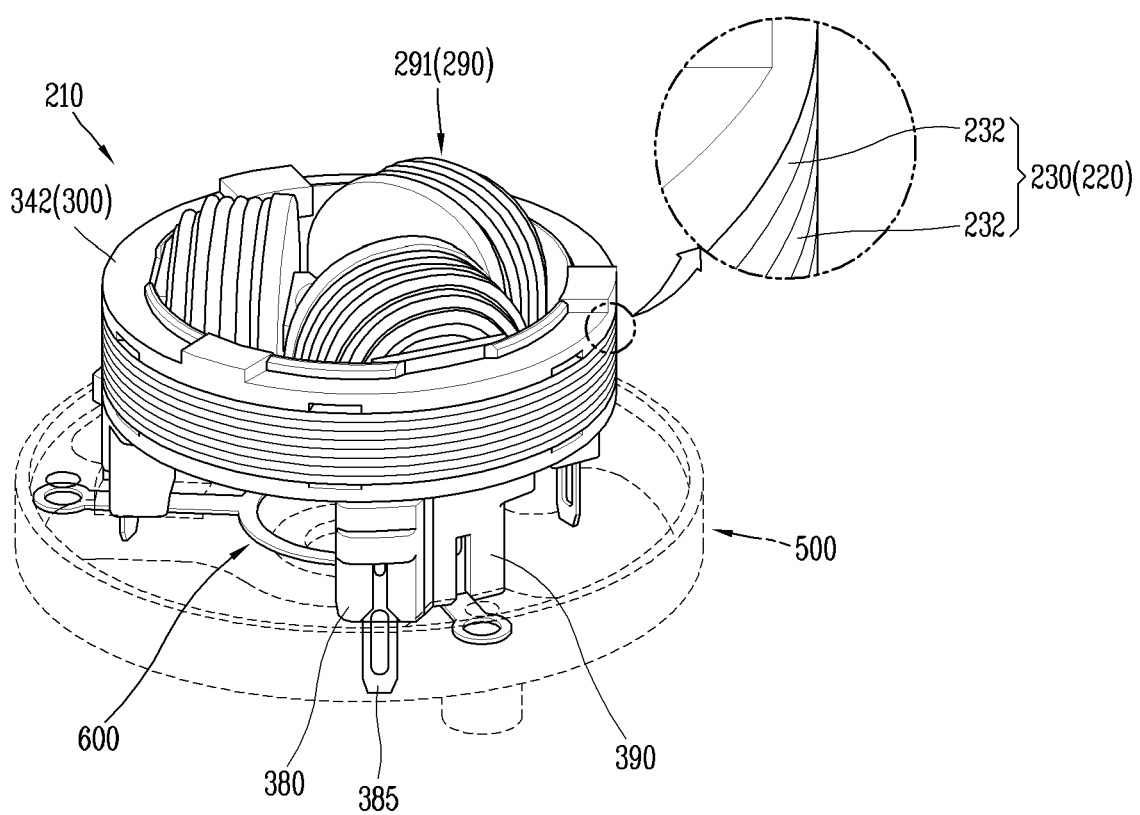
FIG. 3 is a view illustrating an example of coupling of a stator and a connection ring of FIG. 2.
Figure 4:
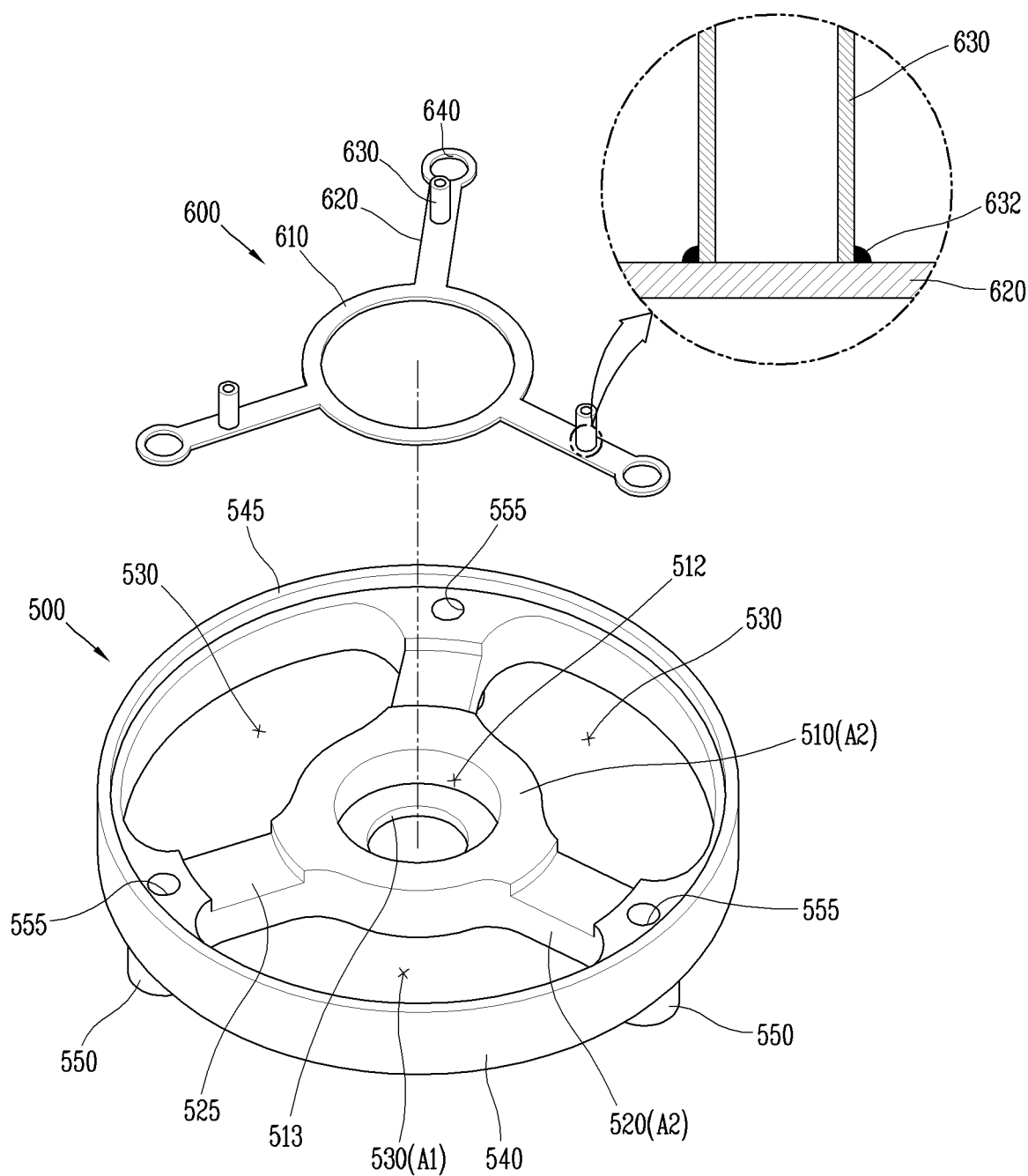
FIG. 4 is a perspective view illustrating an example state before coupling the connection ring and a bracket of FIG. 2.
Figure 5:
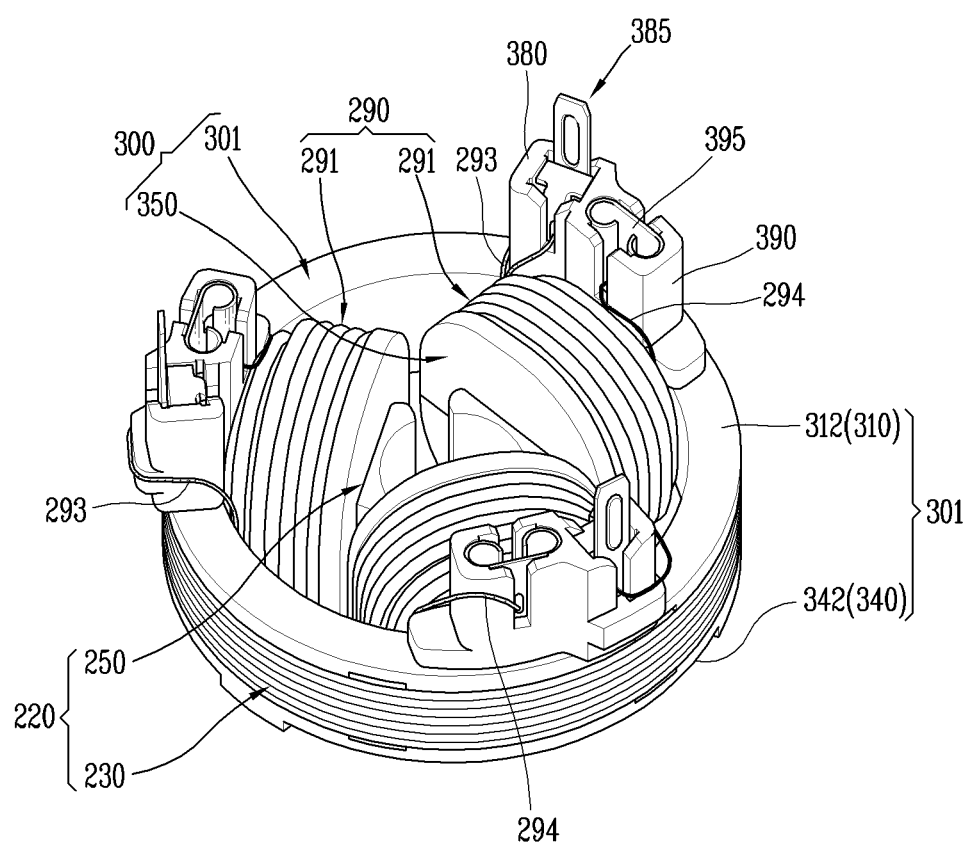
FIG. 5 is a view illustrating an example of a neutral line connection part of the stator of FIG. 3.
Figure 6:
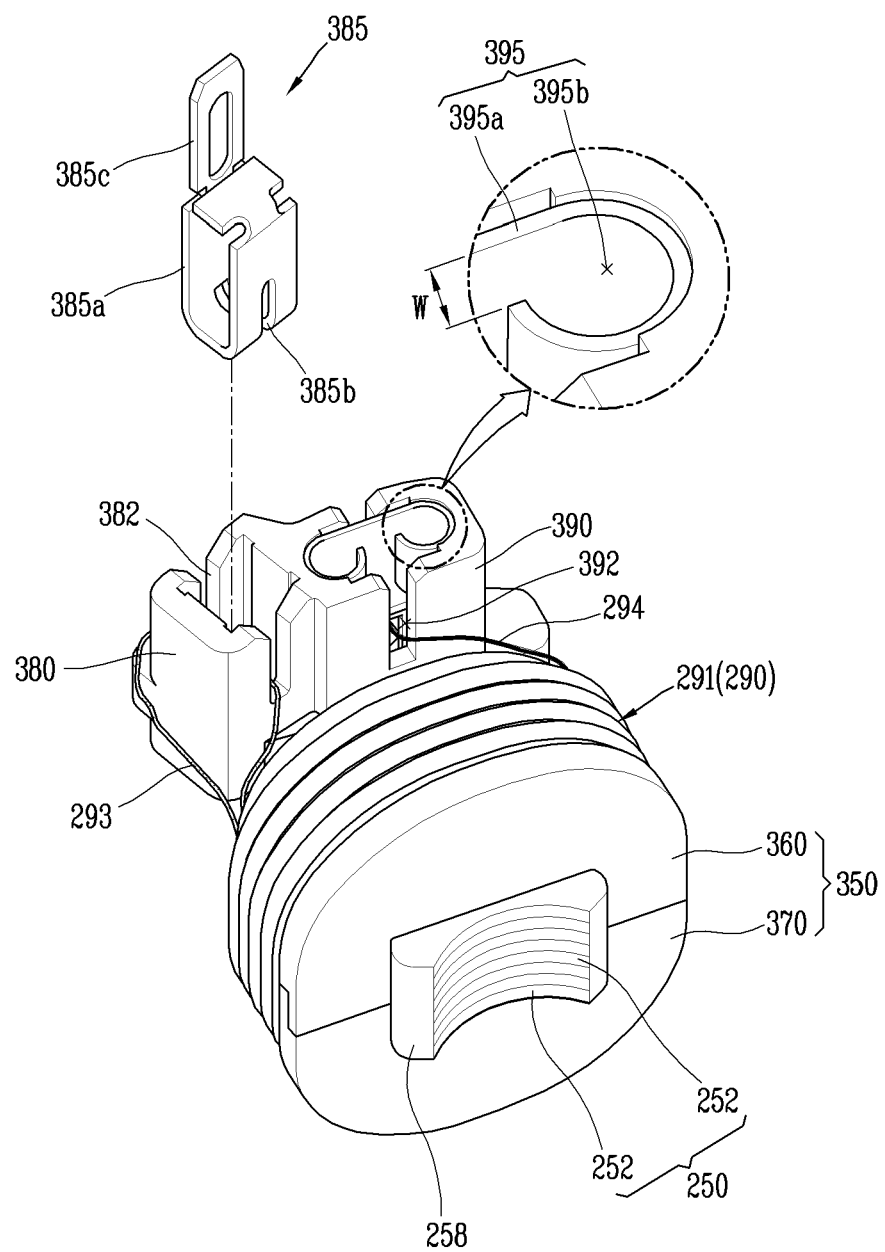
FIG. 6 is an exploded perspective view illustrating examples of a yoke and a tooth of the stator of FIG. 5.
Figure 7:
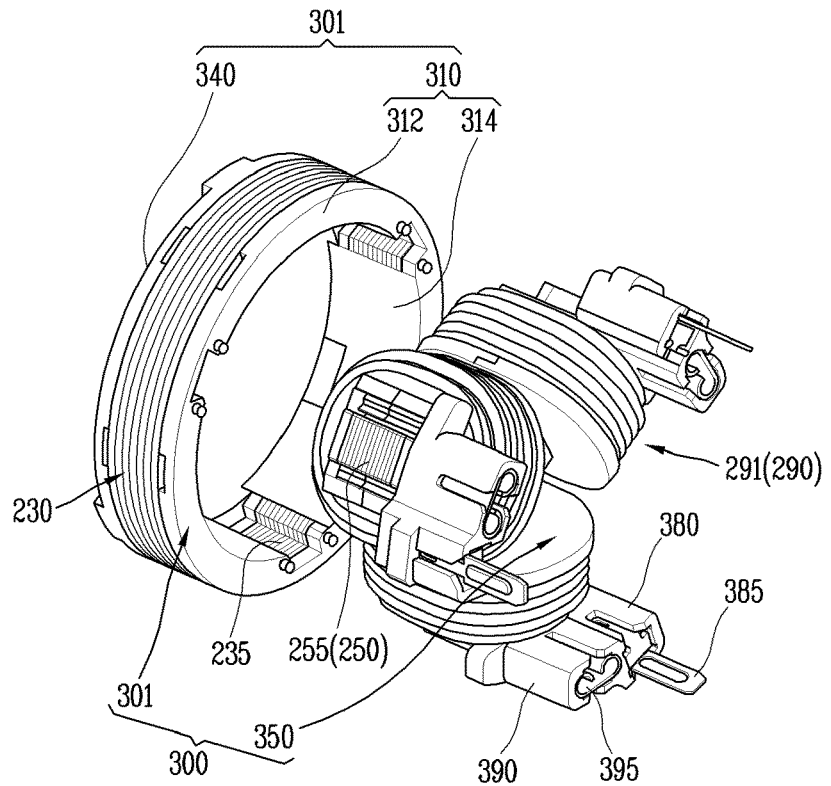
FIG. 7 is an exploded perspective view illustrating an example of a PCB connection terminal of the tooth of FIG. 6.

FIG. 3 is a view illustrating an example of a coupled state of the stator and the connection ring of FIG. 2, FIG. 4 is a perspective view illustrating an example state before coupling the connection ring and the bracket of FIG. 2, FIG. 5 is a view illustrating the neutral line connection part of the stator of FIG. 3, FIG. 6 is an exploded perspective view illustrating examples of a yoke and a tooth of the stator of FIG. 5, and FIG. 7 is an exploded perspective view illustrating the PCB connection terminal of the tooth of FIG. 6.

In some implementations, referring to FIGS. 3 and 5 to 7, the stator core 220 can include a yoke 230 and a plurality of teeth 250 coupled to the yoke 230. For example, the yoke 230 can have a ring shape.

A plurality of tooth coupling portions 235 can be provided on an inner surface of the yoke 230 so that the plurality of teeth 250 can be coupled in the axial direction.

The plurality of tooth coupling portions 235 can be recessed into the inner surface of the yoke 230 outwardly in a radial direction.

The yoke 230 can be formed, for example, by stacking a plurality of annular electrical steel sheets 232 in an insulating manner.

Each of the plurality of teeth 250 can include an insertion end portion 255 that is formed on one side (outer side in the drawing) thereof in the radial direction so as to be coupled to the tooth coupling portion 235 of the yoke 230.

Each of the plurality of teeth 250 can include shoes 258 formed on another side (inner side in the drawing) in the radial direction to extend to both sides in a circumferential direction.

The plurality of teeth 250 can be formed, for example, by stacking a plurality of electrical steel sheets 252 in an insulating manner.

In some implementations, the insulator 300 can include, for example, a yoke insulator 301 for insulating the yoke 230, and a plurality of tooth insulators 350 for insulating the plurality of teeth 250, respectively.

The yoke insulator 301 can include, for example, a first yoke insulator 310 and a second yoke insulator 340 coupled to each other in the axial direction.

The first yoke insulator 310 can include, for example, an end insulating portion 312 for insulating one end portion (lower end portion in the drawing) of the yoke 230 and an inner surface insulating portion 314 for insulating the inner surface of the yoke 230.

The second yoke insulator 340 can include, for example, an end insulating portion 342 for insulating another end portion (upper end portion in the drawing) of the yoke 230.

The inner surface insulating portion 314 of the first yoke insulator 310 can be inserted into one side (lower side) of the yoke 230 in the axial direction to protrude to another side (upper side).

The second yoke insulator 340 can be configured such that the inner surface insulating portion 314 of the first yoke insulator 310 protruding to the another side (the upper side in the drawing) of the yoke 230 is inserted into its inner side.

The tooth insulator 350 can include a first tooth insulator 360 and a second tooth insulator 370 coupled to both sides of the tooth 250 in the axial direction with the tooth 250 interposed therebetween.

The first tooth insulator 360 and the second tooth insulator 370 can be configured to block four surfaces (upper, lower, and both side surfaces) of the tooth 250.

The plurality of teeth 250 and the tooth insulators 350 can be configured such that the insertion end portion 255 inserted into the yoke 230 and a part of the shoe 258 are exposed to the outside of the tooth insulator 350.

In some implementations, each of the tooth insulators 350 can include a power line connection part 380 to which one end portion (power line 293) of one coil part 291 of the stator coil 290 is connected.

Each of the tooth insulators 350 can include a neutral line connection part 390 to which another end portion (neutral line 294) of the coil part 291 of the stator coil 290 is connected.

The power line connection part 380 and the neutral line connection part 390 can be provided on, for example, the first tooth insulator 360, respectively.

Each of the power line connection part 380 and the neutral line connection part 390 can be configured to protrude to one side (lower side based on FIG. 1) in the axial direction.

Each of the power line connection part 380 and the neutral line connection part 390 can have an accommodation space which is open to the one side (the lower side based on FIG. 1) in the axial direction.

The power line connection part 380 can include a cutout portion 382 which is cut out so that the power line 293 of the coil part 291 can be coupled.

The cutout portion 382 of the power line connection part 380 can be cut out in the axial direction, so that the power line 293 is coupled in the axial direction.

The power line connection part 380 can accommodate a PCB connection terminal 385 which has one side connected to the power line 293 and another side connected to the PCB 490.

The PCB connection terminal 385 can be configured as a metal member that is an electric conductor.

The PCB connection terminal 385 can include, for example, a body 385a inserted into the power line connection part 380 and a connection piece 385c protruding from the body 385a to be connected to the PCB 490. The body 385a can include a slit 385b that is cut to allow the power line 293 to be inserted therein.

The power line 293 can press-fitted into the slit 385b of the PCB connection terminal 385.

In some implementations, when the power line 293 is press-fitted into the slit 385b of the PCB connection terminal 385, a conductor of the power line 293 and the PCB connection terminal 385 can be brought into direct contact with each other so as to be electrically connected.

The neutral line connection part 390 can include a cutout portion 392 cut out in the axial direction.

The neutral line 294 of the coil part 291 can be inserted into the cutout portion 392.

A neutral line connection conductor 395 which is connected to the connection ring 600 can be accommodated in the neutral line connection part 390.

The neutral line connection conductor 395, for example, can be configured as a metal member which is an electrical conductor.

The neutral line connection conductor 395 can include, for example, a connection pin accommodating portion 395b, into which a connection pin 630 of the connection ring 600 to be described later, is inserted.

The neutral line connection conductor 395 can include, for example, a body 395a in a plate shape and a plurality of connection pin accommodating portions 395b formed in a ring shape in both sides of the body 395a.

The plurality of connection pin accommodating portions 395b can be two, for example.

In some implementations, the plurality of connection pin accommodating portions 395b can have a cross section in a circular ring shape with one side open.

The connection pin accommodating portions 395b can be formed, for example, by rolling both end portions of the body 395a into a shape having an annular cross section.

An end portion of each connection pin accommodating portion 395b can be spaced apart from the body 395a by a predetermined distance W, for example.

In some implementations, the connection pin accommodating portion 395b can have an inner diameter which is smaller than an outer diameter of the connection pin 630.

Accordingly, the end portion of the connection pin accommodating portion 395b can be elastically deformed outward when the connection pin 630 is inserted.

In some implementations, the end portion of the connection pin accommodating portion 395b can accumulate an elastic force by being elastically opened (spread) outward as the connection pin 630 is inserted, and thus the connection pin accommodating portion 395b can be in close contact with an outer surface of the connection pin 630 by the accumulated elastic force when the connection pin 630 is completely inserted.

The elastic force which is accumulated during the elastic deformation of the connection pin accommodating portion 395b can act as contact pressure that causes the connection pin accommodating portion 395b to be in close contact with the outer surface of the connection pin 630. Therefore, the connection pin 630 and the connection pin accommodating portion 395b can be stably maintained in the contact state (electrically connected state).

The body 395a can include a slit which is cut so that the neutral line 294 of the coil part 291 is inserted.

Accordingly, the neutral line 294 can be press-fitted into the slit.

When the neutral line 294 and the neutral line connection conductor 395 are press-fitted into the slit of the body 395a, a conductor of the neutral line 294 and the neutral line connection conductor 395 can be in direct contact with each other.

In some examples, as illustrated in FIG. 4, the bracket 500 can include a bearing accommodating portion 510 in which the bearing 450 is accommodated, a plurality of spoke portions 520 radially disposed on an outer surface of the bearing accommodating portion 510, and a rim 540 connecting each end portion of the plurality of spoke portions 520.

The bearing accommodating portion 510 can have a bearing accommodation space 512 that is recessed in the axial direction so that the bearing 450 can be accommodated in the axial direction.

More specifically, the bearing accommodation space 512 can be formed to accommodate the bearing holder 455, for example.

The bearing accommodation space 512 can be formed to have both sides open in the axial direction.

The bearing accommodating portion 510 can include a through-hole 513 formed therethrough in the axial direction so that inside and outside of the bearing accommodation space 512 can communicate with each other.

Accordingly, when the bearing 450 is accommodated in the bearing accommodation space 512, heat dissipation of the bearing 450 can be facilitated by the through-hole 513.

The through-hole 513, for example, can have an inner diameter that is reduced compared to an inlet (inner diameter) of the bearing accommodation space 512.

The inner diameter of the through-hole 413 can be, for example, smaller than an inner diameter of the outer ring 451 of the bearing 450.

The plurality of spoke portions 520 can be, for example, three in number.

The plurality of spoke portions 520, for example, can be configured to be disposed between the plurality of teeth 250 of the stator 210, respectively.

The bearing accommodating portion 510 and the plurality of spoke portions 520 can have the same thickness (in the axial direction), for example.

The rim 540 can be, for example, concentrically arranged with the bearing accommodating portion 510.

The rim 540 can include a housing coupling portion 545 having one side (upper side in the drawing) protruding from the bearing accommodating portion 510 and the spoke portions 520 in the axial direction.

An area (the insertion portion 125) of the housing 110 can be inserted into the rim 540 (the housing coupling portion 545) by a predetermined depth (see FIG. 1).

Accordingly, the housing 110 and the bracket 500 can be concentrically coupled to each other.

In some implementations, the concentricity between the stator 210 and the rotor 420 accommodated in the housing 110 and concentricity between the bracket 500 and the bearing 450 can all be improved.

A plurality of through portions 530 through which air flowing during the rotation of the impeller 130 passes can be formed between adjacent spoke portions 520 of the plurality of spoke portions 520, respectively.

The plurality of through portions 530 can define passing areas A1 through which the air flowing (moved) during the rotation of the impeller 130 passes.

A non-passing area A2 through which the air does not pass can be defined at a downstream side of each of the bearing accommodating portion 510, the plurality of spoke portions 520, and the rim 540 based on a flowing (moving) direction of the air moved when the impeller 130 rotates.

A plurality of boss portions 550 can protrude from one side (lower side in the drawing) of the bracket 500 in the axial direction, such that the PCB 490 can be coupled to be spaced apart from the bracket 500 by a preset distance.

Fixing member coupling portions 555 into which fixing members 122 passing through the PCB 490 are coupled can be formed through the bracket 500.

The fixing member coupling portions 555 can be formed through the plurality of boss portions 550 in the axial direction, for example.

The connection ring 600 can include a circular conductor 610 and a plurality of linear conductors 620 radially connected to an outer surface of the circular conductor 610.

The circular conductor 610 can be formed, for example, to correspond to the bearing accommodating portion 510 of the bracket 500.

The circular conductor 610 may, for example, have an inner diameter larger than an inner diameter of the bearing accommodation space 512 of the bearing accommodating portion 510.

The plurality of linear conductors 620 can extend from the outer surface of the circular conductor 610 in the radial direction, respectively.

Each of the plurality of linear conductors 620 can include, for example, a connection pin 630 protruding in the axial direction.

The connection pins 630 can be formed at positions corresponding to the neural line connection parts 390, respectively.

Each of the connection pins 630, for example, can be configured as an electrical conductor.

The connection pin 630, for example, can be formed in a cylindrical shape.

The connection pin 630, for example, can protrude from one planar (flat) surface (upper surface in the drawing) of the linear conductor 620 in the axial direction.

When the connection pin 630 is coupled to the bracket 500, the connection pin 630 can protrude toward the stator 210 and can be inserted into the neutral line connection part 390.

The connection pins 630 can be welded to the plurality of linear conductors 620, for example.

Welding portions 632 can be formed on boundary areas between the connection pins 630 and the plurality of linear conductors 620, respectively.

Each of the plurality of linear conductors 620 can extend toward the rim 540, for example.

Each of the plurality of linear conductors 620 can be configured such that a width is larger than a thickness.

The plurality of linear conductors 620 can include, for example, fixing member inserting portions 640 corresponding to the fixing member coupling portions of the bracket 500, respectively.

The fixing member inserting portions 640 can be formed to have a size which is large enough to accommodate the fixing member 122 coupled to the fixing member coupling portion 555.

The fixing member inserting portion 640, for example, can be formed in a shape of a circulate ring.

In some examples, the plurality of spoke portions 520 can include recess portions 525 recessed in the axial direction, respectively.

The recess portions 525 of the plurality of spoke portions 520 can be formed to correspond to, for example, the connection pins 630 of the connection ring 600, respectively.

Each connection pin 630 of the connection ring 600 and each recess portion 525 of the bracket 500 can be disposed, for example, such that the connection pin 630 corresponds to the recess portion 525 when the connection ring 600 is coupled to the bracket 500.

Figure 8:
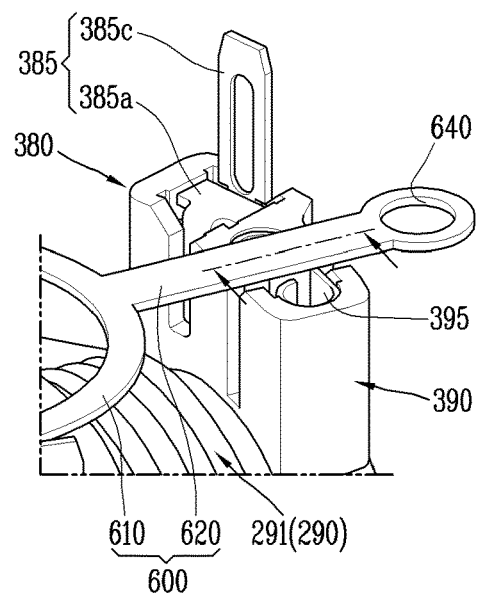
FIG. 8 is an enlarged perspective view illustrating an example of a coupling area of a connection pin of the connection ring of FIG. 3.
Figure 9:
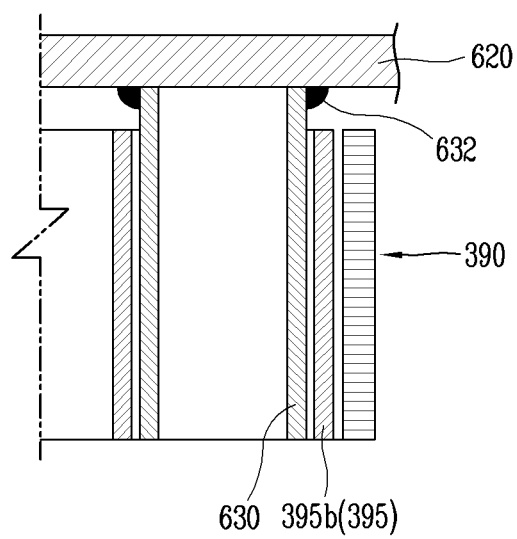
FIG. 9 is a cross-sectional view illustrating an example of a connection pin area of FIG. 8.

FIG. 8 is an enlarged perspective view illustrating an example of a coupling area of the connection pin of the connection ring of FIG. 3, and FIG. 9 is a cross-sectional view illustrating an example of a connection pin area of FIG. 8. As illustrated in FIGS. 8 and 9, the connection pin 630 of the connection ring 600 can be inserted into the neutral line connection part 390 of the stator 210.

The connection pin 630 can be inserted into the connection pin accommodating portion 395b of one side of the neutral line connection conductor 395 disposed in the neutral line connection part 390.

The neutral line connection conductor 395 and the connection pin 630, as aforementioned, can be elastically coupled to each other.

Accordingly, when the connection pin 630 of the connection ring 600 is coupled into the connection pin accommodating portion 395b of the neutral line connection conductor 395, the connection pin accommodating portion 395b can be elastically deformed outward. After the connection pin 630 is inserted, the connection pin accommodating portion 395b can be elastically brought into close contact with the outer surface of the connection pin 630 by the accumulated elastic force.

In some implementations, before the yoke 230 and the plurality of teeth 250 are coupled to each other, the first tooth insulator 360 and the second tooth insulator 370 can be coupled to a periphery of each of the plurality of teeth 250, and the coil part 291 can be wound around the to periphery of each of the tooth insulators 350.

The power line 293 of the coil part 291 can be inserted into the power line connection part 380 and the PCB connection terminal 385 can be inserted into the power line connection part 380. Accordingly, the power line 293 of the coil part 291 can be electrically connected to the PCB connection terminal 385.

The neutral line 294 of the coil part 291 can be inserted into the neutral line connection part 390 and the neutral line connection conductor 395 can be inserted into the neutral line connection part 390. Accordingly, the neutral line 294 of the coil part 291 can be electrically connected to the neutral line connection conductor 395.

Next, the connection pin 630 of the connection ring 600 can be inserted into the neutral line connection part 390. At this time, the connection pin accommodating portion 395b of the neutral line connection conductor 395 can be elastically coupled closely to the outer surface of the connection pin 630. Accordingly, the connection pin 630 and the neutral line connection conductor 395 can be subject to contact pressure of a preset magnitude, so as to be stably maintained in the contact state.

When the winding and connection of each of the plurality of coil parts 291 is completed, the plurality of teeth 250 can be coupled to the yoke 230 in the axial direction, respectively.

When the yoke 230 and the plurality of teeth 250 are completely coupled to each other, the stator 210 can be coupled to one side (the stator accommodating portion 112) in the housing 110.

The rotor 420 can be accommodated in the stator 210.

The bearing 450 can be coupled to a lower end portion of the rotation shaft 430 of the rotor 420.

Next, the bracket 500 can be disposed at the bottom of the housing 110 in a manner that the PCB connection terminal 385 of the stator 210 corresponds to the through portion 530 of the bracket 500 and the fixing member coupling portion 120 of the housing 110 communicates with the fixing member coupling portion 555 of the bracket 500.

The bracket 500 can be pressed in the axial direction in the state where the bearing 450 is disposed to correspond to an inlet of the bearing accommodating portion 510. At this time, the insertion portion 125 of the housing 110 can be inserted into the housing coupling portion 545 of the bracket 500 (see FIG. 1).

Next, the PCB 490 can be disposed beneath the bracket 500 and pressed so that the PCB connection terminal 385 is inserted into the PCB connection terminal inserting portion 493.

The fixing member 122 can then be inserted into the fixing member inserting portion 492 of the PCB 490. The fixing member 122 can be coupled to the fixing member coupling portion 120 of the housing 110 sequentially via the fixing member coupling portion 555 of the bracket 500 and the fixing member inserting portion 640 of the connection ring 600.

Accordingly, the PCB 490, the bracket 500, and the connection ring 600 can all be integrally coupled to the housing 110 by the fixing member 122.

The impeller 130 can be inserted into another side (upper side in the drawing) of the housing 110 and the bearing 450 can be coupled to an upper end portion of the rotation shaft 430.

Next, the bearing 450 can be inserted into the bearing accommodating portion 155 of the first guide vane 151 and the second guide vane 152 can be inserted into the housing 110.

In some examples, when an operation is started and power is applied to the stator coil 290, a magnetic field formed by the stator coil 290 and a magnetic field of the rotor 420 can interact with each other, so that the rotor 420 can rotate together with the rotation shaft 430. Responsive to this, the impeller 130 coupled to the rotation shaft 430 can rotate, and external air of the housing 110 can be sucked into the housing 110.

At this time, the stator 210 and the rotor 420 can be directly cooled by air of a relatively low temperature, which is sucked from the outside of the housing 110. This can result in facilitating cooling of the stator 210 and the rotor 420.

In addition, the stator 210 can be continuously cooled by the air of the relatively low temperature, introduced from the outside of the housing 110, so as to be maintained at a relatively low temperature. Accordingly, electric resistance of the plurality of coil parts 291 can be reduced. This can result in improving the output of the electric motor assembly 100a.

Figure 10:
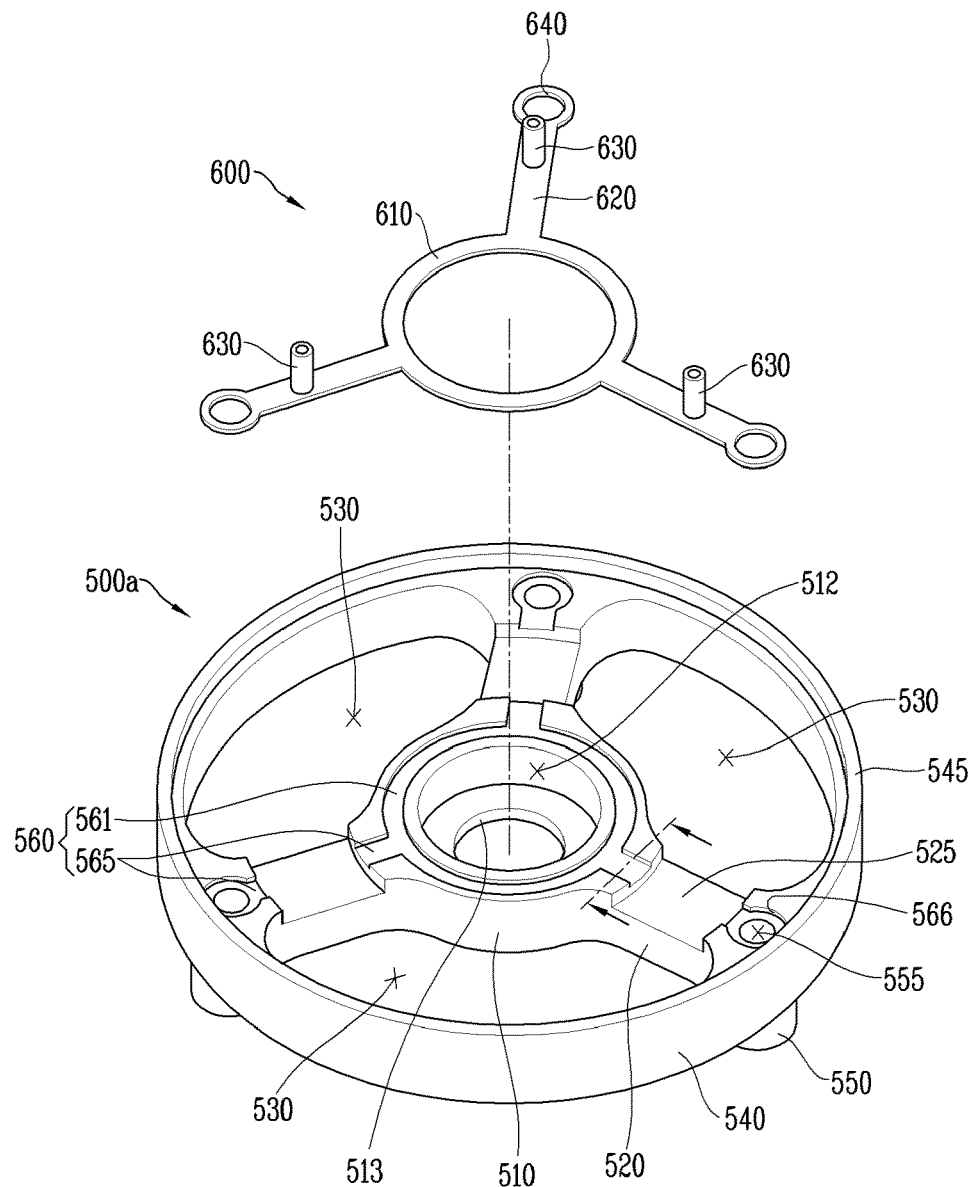
FIG. 10 is an exploded perspective view illustrating examples of a connection ring and a bracket of an electric motor assembly.
Figure 11:
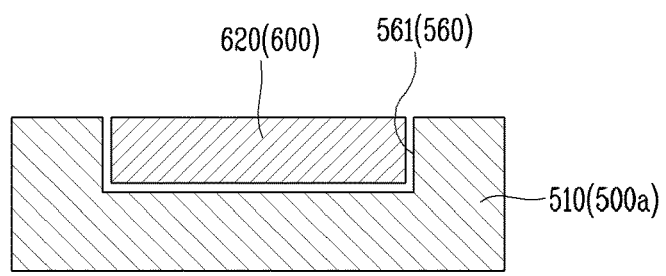
FIG. 11 is a partial cross-sectional view illustrating an example of a coupled state of the connection ring and the bracket of FIG. 10.

FIG. 10 is an exploded perspective view illustrating an example of a connection ring and a bracket of an electric motor assembly, and FIG. 11 is a partial cross-sectional view illustrating an example of a coupled state of the connection ring and the bracket of FIG. 10.

In some implementations, an electric motor assembly can include the housing 110, the impeller 130, the stator 210, the rotor 420, a bracket 500a, and the connection ring 600.

The impeller 130 can be accommodated at one side in the housing 110.

The stator 210 can be accommodated at another side in the housing 110.

The stator 210 can be disposed at an upstream side of the impeller 130 along a moving (flowing) direction of air that is moved when the impeller 130 rotates.

The rotor 420 can be rotatably provided inside the stator 210.

The bracket 500a can be provided on one side (lower side in the drawing) of the stator 210 in the axial direction.

A PCB 490 can be disposed at one side (lower side in the drawing) of the bracket 500a in the axial direction to be spaced apart by a preset distance.

A guide vane 150 can be disposed at a downstream side of the impeller 130 based on the moving direction of the air that is moved when the impeller 130 rotates.

The stator 210 can include a stator core 220, a stator coil 290 wound around the stator core 220, and an insulator 300 provided between the stator core 220 and the stator coil 290.

The stator core 220 can include, for example, a yoke 230 in a ring shape, and a plurality of teeth 250 radially coupled to an inner surface of the yoke 230.

The stator coil 290 can include a plurality of coil parts 291 that is wound on the plurality of teeth 250 in a concentrated winding manner.

The insulator 300 can include a yoke insulator 301 for insulating the yoke 230, and tooth insulators 350 for insulating the plurality of teeth 250, respectively.

The insulator 300 can include a plurality of power line connection parts 380 to which power lines 293 of the plurality of coil parts 291 are connected, respectively, and a plurality of neutral line connection parts 390 to which neutral lines 294 of the plurality of coil parts 291 are connected, respectively.

As described above, neutral line connection conductors 395 can be inserted into the neutral line connection parts 390.

The connection ring 600 can include a circular conductor 610, and a plurality of linear conductors 620 each having one side connected to the circular conductor 610 and another side connected to the corresponding coil part 291.

Each of the plurality of linear conductors 620 can include a connection pin 630 protruding in the axial direction.

In some examples, the bracket 500a can include, as illustrated in FIG. 10, a bearing accommodating portion 510 in which a bearing 450 is accommodated, and a plurality of spoke portions 520 radially connected to an outer surface of the bearing accommodating portion 510.

A bearing accommodation space 512 can be recessed in the axial direction into the bearing accommodating portion 510. A through-hole 513 can be formed through one side (lower side in the drawing) of the bearing accommodation space 512 such that the bearing accommodation space communicates with the outside.

The bracket 500a can include a rim 540 connecting outer end portions of the plurality of spoke portions 520.

The rim 540 can be configured, for example, to be concentrically arranged with the bearing accommodating portion 510.

The bracket 500a can include a connection ring accommodating portion 560 in which the connection ring 600 is accommodated.

The connection ring accommodating portion 560, as illustrated in FIG. 11, can be recessed into one surface (upper surface in the drawing) of the bracket 500a in the axial direction.

The connection ring accommodating portion 560 can have the same thickness (depth) as the thickness of the connection ring 600 or have a thickness (depth) greater than the thickness of the connection ring 600.

In some implementations, in a state in which the connection ring 600 is accommodated in the bracket 500a, when the bracket 500a is coupled to an end portion of the housing 110, the plurality of connection pins 630 can be naturally inserted into the neutral line connection parts 390, respectively, and thus the connection of the neutral lines 294 of the plurality of coil parts 291 can be made quickly and easily.

The connection ring accommodating portion 560 can be recessed into one side (upper side in the drawing) of the bracket 500a in the axial direction, for example.

The connection ring accommodating portion 560 can include, for example, a circular conductor accommodating portion 561 in which the circular conductor 610 is accommodated, and a plurality of linear conductor accommodating portions 562 in which the plurality of linear conductors 620 is accommodated.

The circular conductor accommodating portion 561 can be recessed into an upper surface of the bearing accommodating portion 510 of the bracket 500a.

The plurality of linear conductor accommodating portions 562 can be recessed in upper surfaces of the plurality of spoke portions 520, respectively.

The plurality of linear conductor accommodating portions 562 and the circular conductor accommodating portion 561 can communicate with each other.

A plurality of fixing member coupling portions 555 into which fixing members 122 passing through the PCB 490 are coupled can be formed through the bracket 500a.

Fixing member inserting portions 640 in which the fixing members 122 are inserted can be formed in the plurality of linear conductors 620 of the connection ring 600.

The fixing member inserting portion 640, for example, can be formed in a shape of a circulate ring.

Fixing member inserting portion accommodating portions 566 in which the fixing member inserting portions 640 of the connection ring 600 are accommodated can be formed in circumferences of the fixing member coupling portions 555 of the bracket 500a, respectively.

The fixing member inserting portion accommodating portion 566 can have a circular cross section to correspond to the shape of the fixing member inserting portion 640, for example.

The fixing member inserting portion accommodating portion 566 can be recessed in the axial direction.

In some implementations, the plurality of spoke portions 520 can include recess portions 525, respectively, recessed in the axial direction to correspond to the connection pins 630 of the connection ring 600.

Accordingly, with regard to each of the plurality of linear conductors 620, both side areas of the connection pin 630 can be supported in the radial direction and one side area (lower side area in the drawing) of the connection pin 630 can be spaced apart from the bracket 500a. Thus, the connection pin 630 can be elastically supported.

More specifically, upon coupling the bracket 500a and the housing 110 to each other, when the connection pin 630 is inserted into the connection pin accommodating portion 395b in the axial direction, the one side (the lower side in the drawing) of the connection pin 630 can be spaced apart from the bracket 500a by the recess portion 525 so as to be elastically deformable in the axial direction (i.e., spring action), which can allow appropriate elastic deformation of the connection pin accommodating portion 395b. Accordingly, the connection pin 630 and the connection pin accommodating portion 395b can obtain appropriate contact pressure with respect to each other, so as to be smoothly connected to each other and stably maintained in the connected state.

Figure 12:
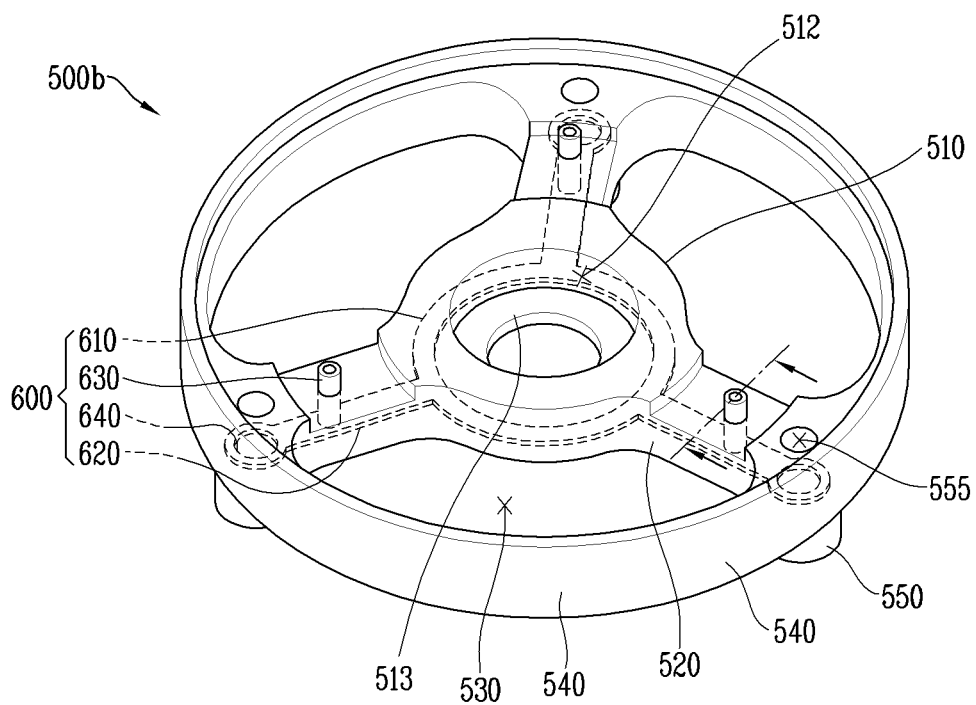
FIG. 12 is a perspective view illustrating an example of a connection ring and a bracket of an electric motor assembly.
Figure 13:
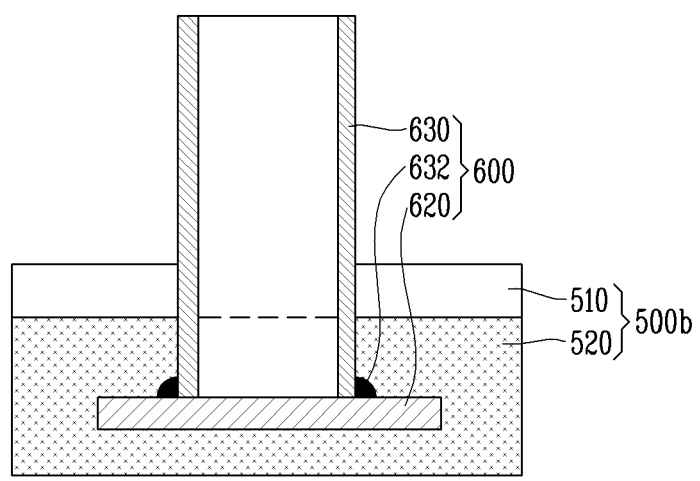
FIG. 13 is a cross-sectional view illustrating an example of a connection pin area of FIG. 12.

FIG. 12 is a perspective view illustrating an example of a connection ring and a bracket of an electric motor assembly, and FIG. 13 is a cross-sectional view illustrating an example of a connection pin area of FIG. 12.

In some implementations, an electric motor assembly include the housing 110, the impeller 130, the stator 210, the rotor 420, a bracket 500b, and the connection ring 600.

An accommodation space can be defined inside the housing 110.

The impeller 130 can be accommodated at one side and the stator 210 can be accommodated at another side in the housing 110.

The rotor 420 can be rotatably accommodated in the stator 210.

The stator 210 can be disposed at an upstream side of the impeller 130 in a moving (flowing) direction of air that is moved by the impeller 130.

The bracket 500b can be provided on one side (lower side) of the stator 210 in the axial direction.

A PCB 490 can be provided on one side (lower side) of the bracket 500b in the axial direction.

The stator 210 can include a stator core 220, a stator coil 290 wound around the stator core 220, and an insulator 300 provided between the stator core 220 and the stator coil 290.

The stator core 220 can include a yoke 230 in a ring shape, and a plurality of teeth 250 radially coupled to the yoke 230.

The stator coil 290 can include a plurality of coil parts 291 wound around the plurality of teeth 250 in a concentrated winding manner.

The insulator 300 can include power line connection parts 380 to which power lines 293 of the plurality of coil parts 291 are connected, respectively, and neutral line connection parts 390 to which neutral lines 294 of the plurality of coil parts 291 are connected, respectively.

The connection ring 600 can include a circular conductor 610 and a plurality of linear conductors 620 radially connected to an outer surface of the circular conductor 610. Each of the plurality of linear conductors 620 can include the connection pin 630 protruding in the axial direction.

In some examples, the bracket 500b of the electric motor assembly can be configured such that the connection ring 600 is disposed (inserted) therein, as illustrated in FIGS. 10 and 11.

The bracket 500b can be made of, for example, a plastic member by injection molding.

More specifically, the bracket 500b can be formed by injection molding after inserting the connection ring 600 into a mold.

The circular conductor 610 of the connection ring 600 can be disposed inside the bearing accommodating portion 510.

The plurality of linear conductors 620 of the connection ring 600 can be disposed inside the plurality of spoke portions 520 of the bracket 500b, respectively.

The plurality of connection pins 630 can protrude outward from the plurality of spoke portions 520 in the axial direction.

With this configuration, the stator 210 can be accommodated in the housing 110, and the rotor 420 can be accommodated in the stator 210.

The bearing 450 can be coupled to one end portion (lower end portion) of the rotation shaft 430, and the bracket 500b can be coupled to one end portion (lower end portion) of the housing 110.

When the bracket 500b is pressed toward the housing 110 in the axial direction, a bearing 450 can be accommodated in the bearing accommodating portion 510 and also the connection pins 630 can be naturally inserted into the neutral line connection parts 390 of the stator 210, respectively.

At this time, the connection pin accommodating portion 395b of the neutral line connection conductor 395 can be elastically brought into contact with the outer surface of the corresponding connection pin 630, and thus the contact state between the connection pin 630 and the connection pin accommodating portion 395b can be stably maintained.

A PCB 490 can be coupled to the lower side of the bracket 500b, and fixing members 122 can be inserted into fixing member inserting portions 492 of the PCB 490, respectively, to be screwed into the fixing member coupling portions 120 of the housing 110, respectively.

The impeller 130 and a guide vane 150 can be sequentially accommodated in another side (upper portion) of the housing 110.

Figure 14:
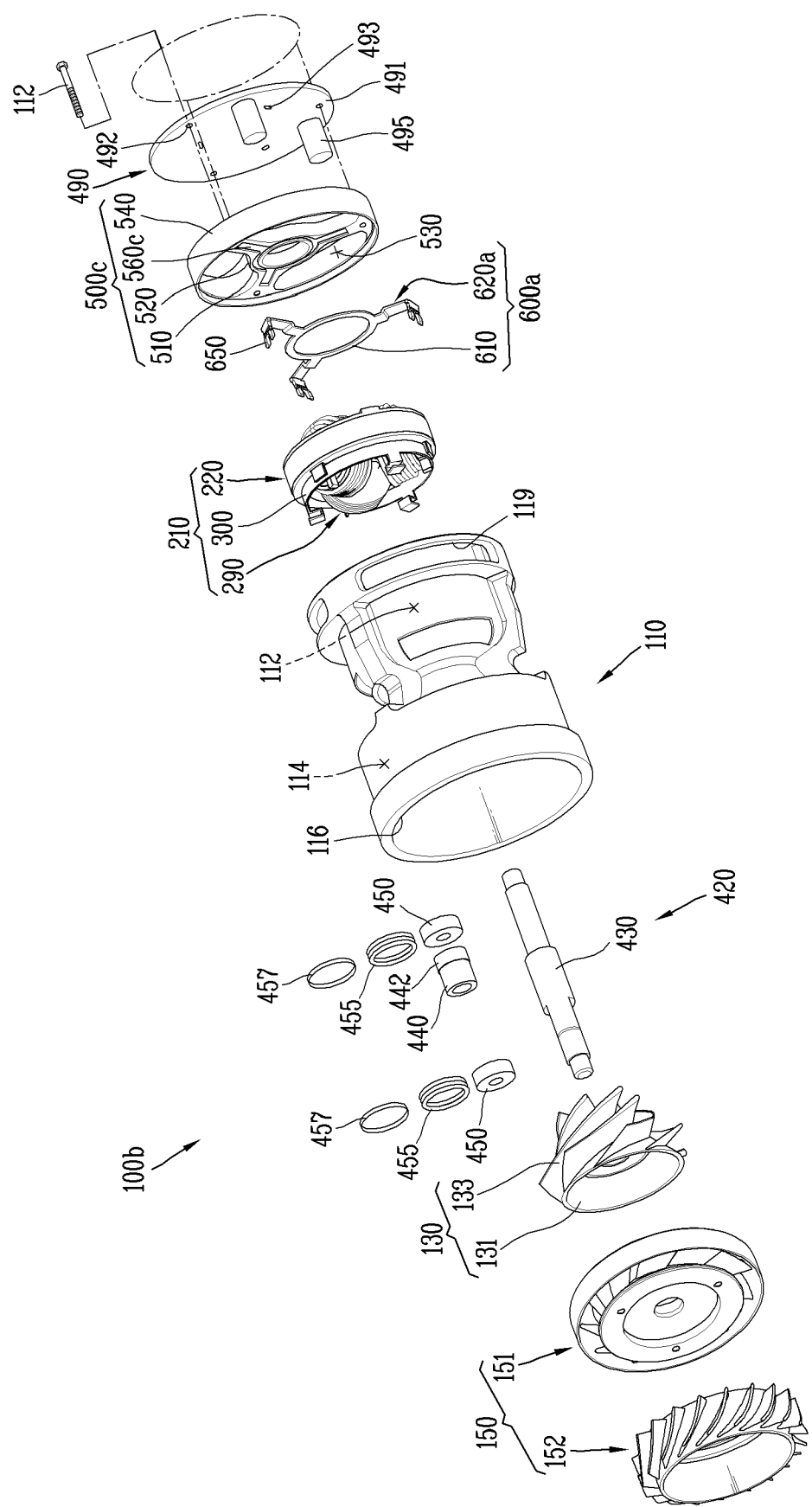
FIG. 14 is an exploded perspective view illustrating an example of an electric motor assembly.

FIG. 14 is an exploded perspective view illustrating an example of an electric motor assembly. An electric motor assembly 100b can include the housing 110, the impeller 130, the stator 210, the rotor 420, a bracket 500c, and a connection ring 600a.

The impeller 130 and a stator 210 can be provided inside the housing 110.

The stator 210 can be disposed at an upstream side of the impeller 130 in a moving (flowing) direction of air that is moved when the impeller 130 rotates.

The rotor 420 can be rotatably accommodated in the stator 210.

The stator 210 can include a stator core 220, a stator coil 290 wound around the stator core 220, and an insulator 300 provided between the stator core 220 and the stator coil 290.

The bracket 500c can be provided on one side (lower side in the drawing) of the housing 110 in the axial direction.

A PCB 490 can be provided on one side (lower side) of the bracket 500c in the axial direction.

The connection ring 600a can be disposed between the stator 210 and the bracket 500c.

Figure 15:
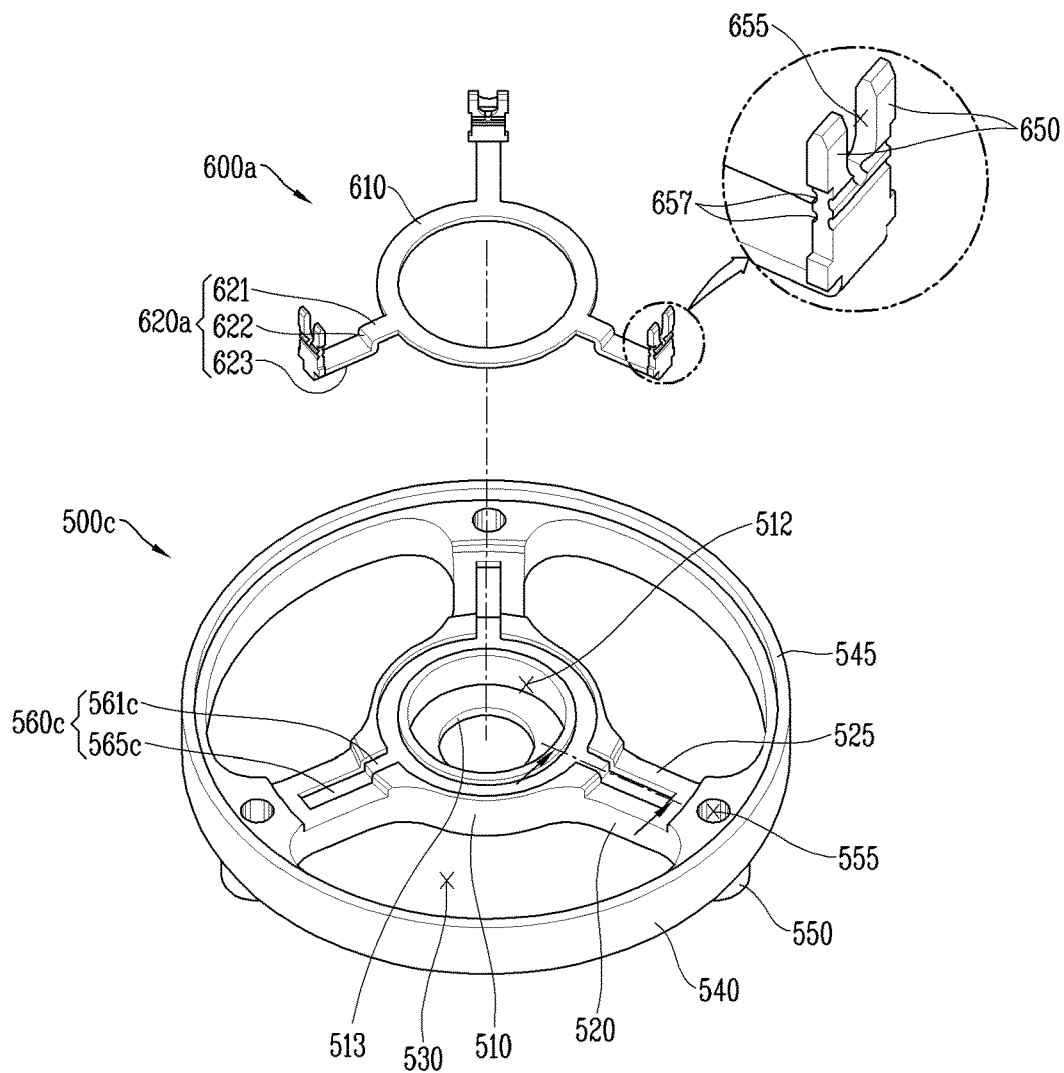
FIG. 15 is a perspective view illustrating an example state before coupling a connection ring and a bracket of FIG. 14.
Figure 16:
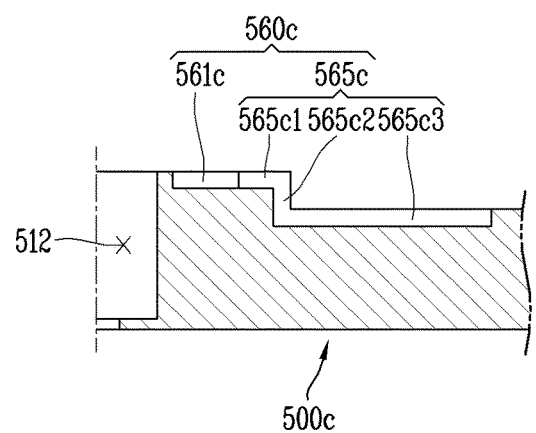
FIG. 16 is a cross-sectional view illustrating example parts of the bracket of FIG. 15.
Figure 17:
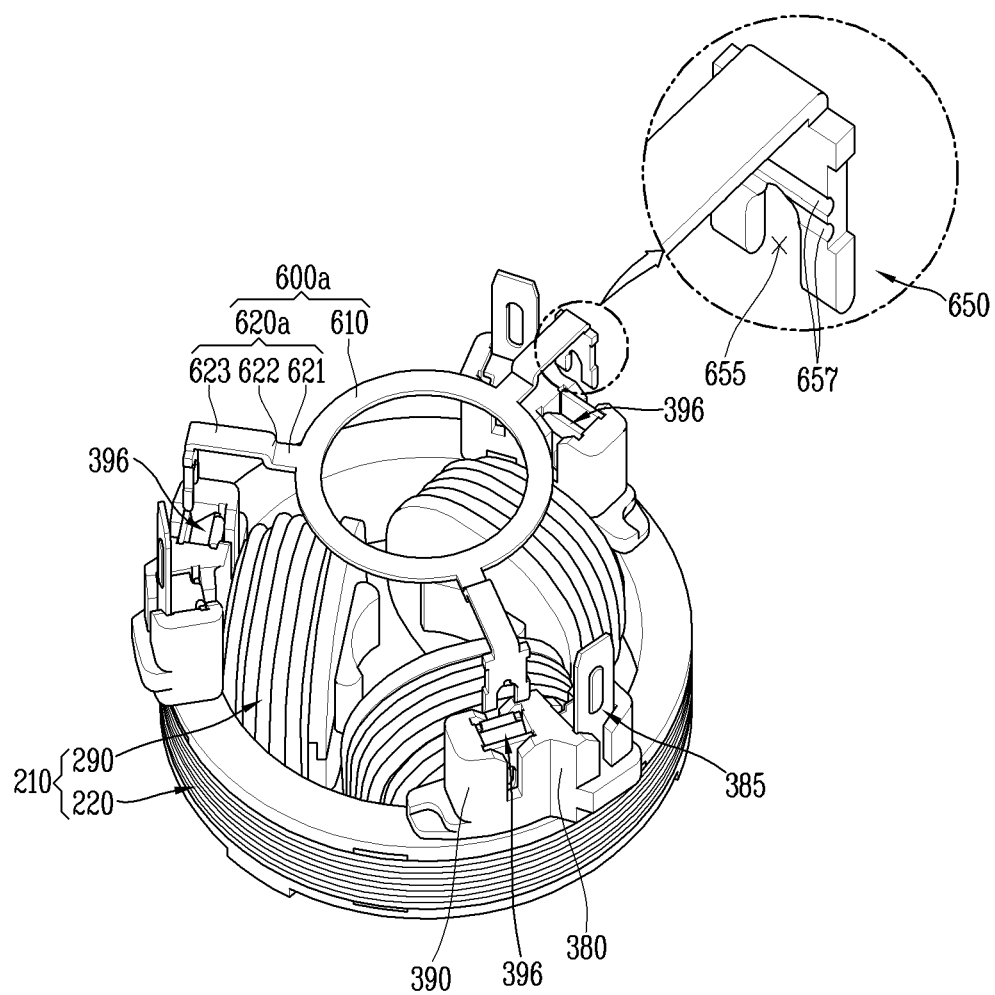
FIG. 17 is a view illustrating an example of coupling of a stator and a connection ring of FIG. 14.

FIG. 15 is a perspective view illustrating an example state before coupling the connection ring and the bracket of FIG. 14, FIG. 16 is a cross-sectional view illustrating example parts of the bracket of FIG. 15, and FIG. 17 is a view illustrating an example of a coupled state of the stator and the connection ring of FIG. 14. As illustrated in FIG. 15, the connection ring 600a can be made of an electric conductor, and can be configured to electrically connect one end portion (neutral line 294) of each of the plurality of coil parts 291 at the same time.

The bracket 500c can include a bearing accommodating portion 510 in which a bearing 450 is accommodated, and a plurality of spoke portions 520 radially connected to an outer surface of the bearing accommodating portion 510.

A bearing accommodation space 512 can be recessed in the axial direction into the bearing accommodating portion 510. A through-hole 513 can be formed through one side (lower side in the drawing) of the bearing accommodation space 512 such that the bearing accommodation space communicates with the outside.

The bracket 500c can include a rim 540 connected to end portions of the plurality of spoke portions 520.

The rim 540 can be implemented in a ring shape.

The rim 540 can be configured, for example, to be concentrically arranged with the bearing accommodating portion 510.

Fixing member coupling portions 555 to which fixing members 122 are coupled can be formed through the bracket 500c in the axial direction.

The plurality of spoke portions 520 can include recess portions 525 recessed in the axial direction, respectively.

As illustrated in FIG. 17, the stator core 220 can include a yoke 230 in a ring shape, and a plurality of teeth 250 radially coupled to an inner surface of the yoke 230.

The stator coil 290 can include a plurality of coil parts 291 wound around the plurality of teeth 250 in a concentrated winding manner. The plurality of coil parts 291 can be connected to respective phases (U phase, V phase, W phase) of a three-phase AC power source.

The insulator 300 can include a yoke insulator 301 for insulating the yoke 230, and tooth insulators 350 for insulating the plurality of teeth 250, respectively.

The insulator 300 can include power line connection parts 380 to which power lines 293 (each one end portion) of the plurality of coil parts 291 are connected, respectively, and neutral line connection parts 390 to which neutral lines 294 (each another end portion) of the plurality of coil parts 291 are connected, respectively.

The power line connection part 380 and the neutral line connection part 390 can be provided on each of the tooth insulators 350.

The power line connection part 380 and the neutral line connection part 390 can protrude in the axial direction.

The connection ring 600a can include a circular conductor 610, and a plurality of linear conductors 620a each having one side connected to the circular conductor 610 and another side connected to the corresponding coil part 291.

The circular conductor 610 can be disposed in the bearing accommodating portion 510 of the bracket 500c, for example.

The circular conductor 610 can be formed in a ring shape. The circular conductor 610 can be disposed on a circumference of an opening of the bearing accommodating portion 510.

The circular conductor 610 can have an inner diameter larger than an inner diameter of the bearing accommodation space 512 of the bearing accommodating portion 510.

The circular conductor 610 can have an outer diameter smaller than an outer diameter of the bearing accommodating portion 510.

The plurality of linear conductors 620a can extend from the outer surface of the circular conductor 610 in the radial direction, respectively.

The plurality of linear conductors 620a can be disposed on the plurality of spoke portions 520 of the bracket 500c.

Each of the plurality of linear conductors 620a can include a bent connection pin 650 that is bent in the axial direction and connected to the neutral line connection part 390.

Each of the plurality of linear conductors 620a can include a first section 621 extending radially from the outer surface of the circular conductor 610, a bent section 622 bent from the first section 621 in the axial direction, and a second section 623 extending from the bent section 622 in the radial direction.

The bent connection pin 650 can be bent from the second section 623 and disposed in the axial direction.

The bent connection pin 650 can include a cutout portion 655 cut out from an end portion thereof in the axial direction.

The cutout portion 655 can have a size which is large enough to accommodate the neutral line 294.

In some implementations, the cutout portion 655 of the bent connection pin 650 can be configured such that a conductor of the bent connection pin 650 is brought into direct contact with a conductor of the neutral line 294 so as to be electrically connected when the neutral line 294 is inserted.

The bent connection pin 650 can include a stop portion 657 that is recessed from a planar surface and extends in a widthwise direction.

The stop portion 657 can be provided in plurality spaced apart from each other in the axial direction.

In some implementations, the bracket 500c, as illustrated in FIGS. 15 and 16, can include connection ring accommodating portions 560c each recessed in the axial direction so that the connection ring 600a can be coupled.

Each of the connection ring accommodating portions 560c can include a circular conductor accommodating portion 561c accommodating the circular conductor 610 and a linear conductor accommodating portion 565c accommodating the linear conductor 620a.

The linear conductor accommodating portion 565c can include a first section accommodating portion 565c1, a bent section accommodating portion 565c2, and a second section accommodating portion 565c3 in which the first section 621, the bent section 622, and the second section 623 of the linear conductor 620a are accommodated, respectively.

Figure 18:
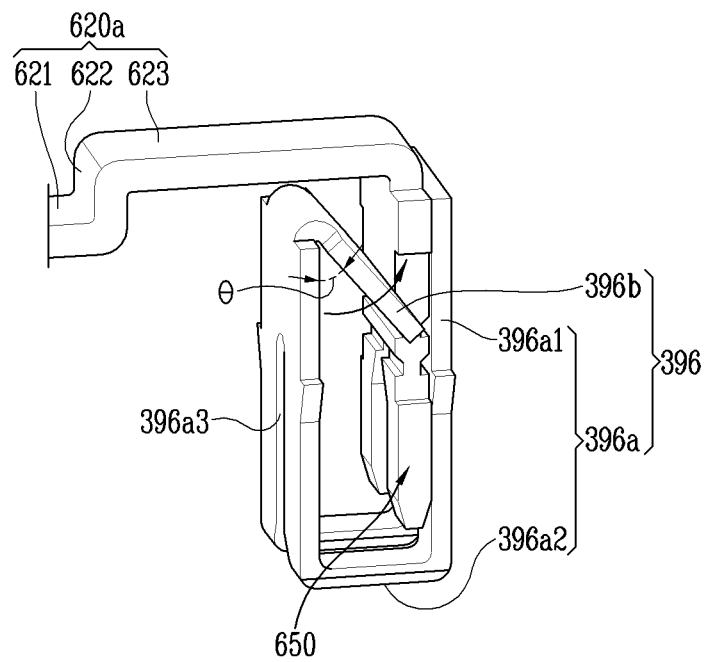
FIG. 18 is a view illustrating an example of coupling of the connection ring and a neutral line connection conductor of FIG. 17.
Figure 19:
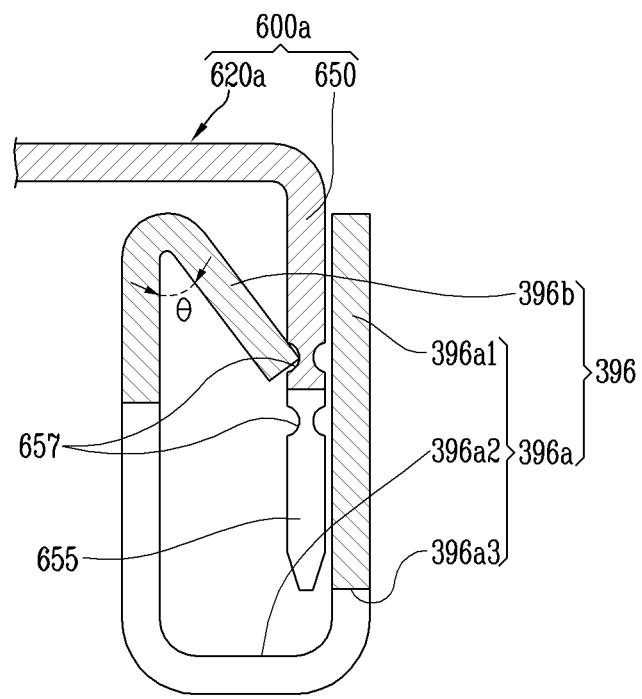
FIG. 19 is a cross-sectional view of FIG. 18.

FIG. 18 is a view illustrating coupling of the connection ring and a neutral line connection conductor of FIG. 17, and FIG. 19 is a cross-sectional view of FIG. 18. As illustrated in FIGS. 18 and 19, a neutral line connection conductor 396 can be provided in each of the neutral line connection parts 390.

The neutral line connection conductor 396 can have one side connected to one end portion (neutral line 294) of the coil part 291 and another side connected to the bent connection pin 650.

Accordingly, the neutral lines 294 of the plurality of coil parts 291 can be connected to the connection ring 600a at the same time.

The neutral line connection conductor 396 can include a body 396a into which the bent connection pin 650 is inserted, and a pressing portion 396b formed on the body 396a to be elastically deformable and elastically press the bent connection pin 650.

The body 396a can have a cross section in a "U" shape, by including both side wall portions 396a1 spaced apart in parallel from each other such that the bent connection pin 650 is inserted therebetween, and a connecting portion 396a2 connecting the both side wall portions 396a1.

The pressing portion 396b can be bent to be inclined inward from an end portion of an inlet side of one of the both side wall portions 396a1.

The pressing portion 396b can be configured, for example, to form a preset interior angle θ with the one side wall portion 396a1. The interior angle θ can be in the range of 30 to 60 degrees, for example.

More specifically, the pressing portion 396b can be formed from one side wall portion 396a1 toward another side wall portion, and a gap which is smaller than a thickness of the bent connection pin 650 can be formed between an end portion of the pressing portion 396b and the one side wall portion 396a1.

The body 396a can include a cutout portion 396a3 that is cut out to allow the insertion of the neutral line 294.

The cutout portion 396a3 can be formed by cutting an opposite side of the body 396a to the inlet side in a lengthwise direction of the both side wall portions 396a1.

The cutout portion 396a3 can be configured such that, for example, the neutral line 294 is press-fitted therein.

The cutout portion 396a3 can be configured such that when the neutral line 294 is inserted, a coating film of the neutral line 294 is removed and a conductor of the neutral line 294 and a conductor of the body 396a are brought into direct contact with each other to be electrically connected to each other.

With this configuration, the stator 210 can be coupled into the housing 110 and the rotor 420 can be accommodated in the stator 210.

The connection ring 600a can be inserted into the connection ring accommodating portion 560c of the bracket 500c in the axial direction.

Next, the bearing 450 of the rotation shaft 430 of the rotor 420 can be disposed to correspond to the bearing accommodating portion 510 of the bracket 500c. The bracket 500c can be pressed in the axial direction such that the bearing 450 is inserted into the bearing accommodating portion 510.

At this time, the bent connection pins 650 of the connection ring 600a protruding from the bracket 500c in the axial direction can be inserted into the neutral line connection parts 390, respectively.

Each of the bent connection pins 650 can be inserted into the body 396a of the neutral line connection conductor 396 while relatively sliding along an outer surface of the pressing portion 396b of the neutral line connection conductor 396.

In this case, the bent connection pin 650 can be pressed by an elastic force of the pressing portion 396b to be brought into close contact with the side wall portion 396a1 of the body 396a.

The pressing portion 396b can become open by being pressed by the bent connection pin 650. When the bent connection pin 650 is inserted into the body 396a, the neutral line 294 inserted into the cutout portion 396a3 of the body 396a can be inserted into the cutout portion 655 of the bent connection pin 650.

Accordingly, the neutral line 294, the neutral line connection conductor 396, and the bent connection pin 650 (i.e., the connection ring 600a) can be electrically connected together at the same time.

The pressing portion 396b which has been elastically deformed when the bent connection pin 650 is inserted can be restored to its original position by its own elastic force. At this time, as illustrated in FIG. 19, an end portion of the pressing portion 396b can be inserted into the stop portion 657 of the bent connection pin 650.

At this time, when an external force is applied in a direction in which the bent connection pin 650 is separated from the body 396a (in a direction opposite to an inserting direction), the separation of the bent connection pin 650 can be suppressed because the stop portion is locked by the end portion of the pressing portion 396b.

Accordingly, the connection of the neutral lines 294 of the plurality of coil parts 291 can be stably maintained.

In some examples, when the housing 110 and the bracket 500c are coupled to each other, the PCB 490 can be coupled to the PCB connection terminal 385 protruding from the stator 210.

Next, the PCB 490, the bracket 500c, and the housing 110 can be integrally coupled by inserting the fixing members 122 into the fixing member inserting portions 492 of the PCB 490.

Figure 20:
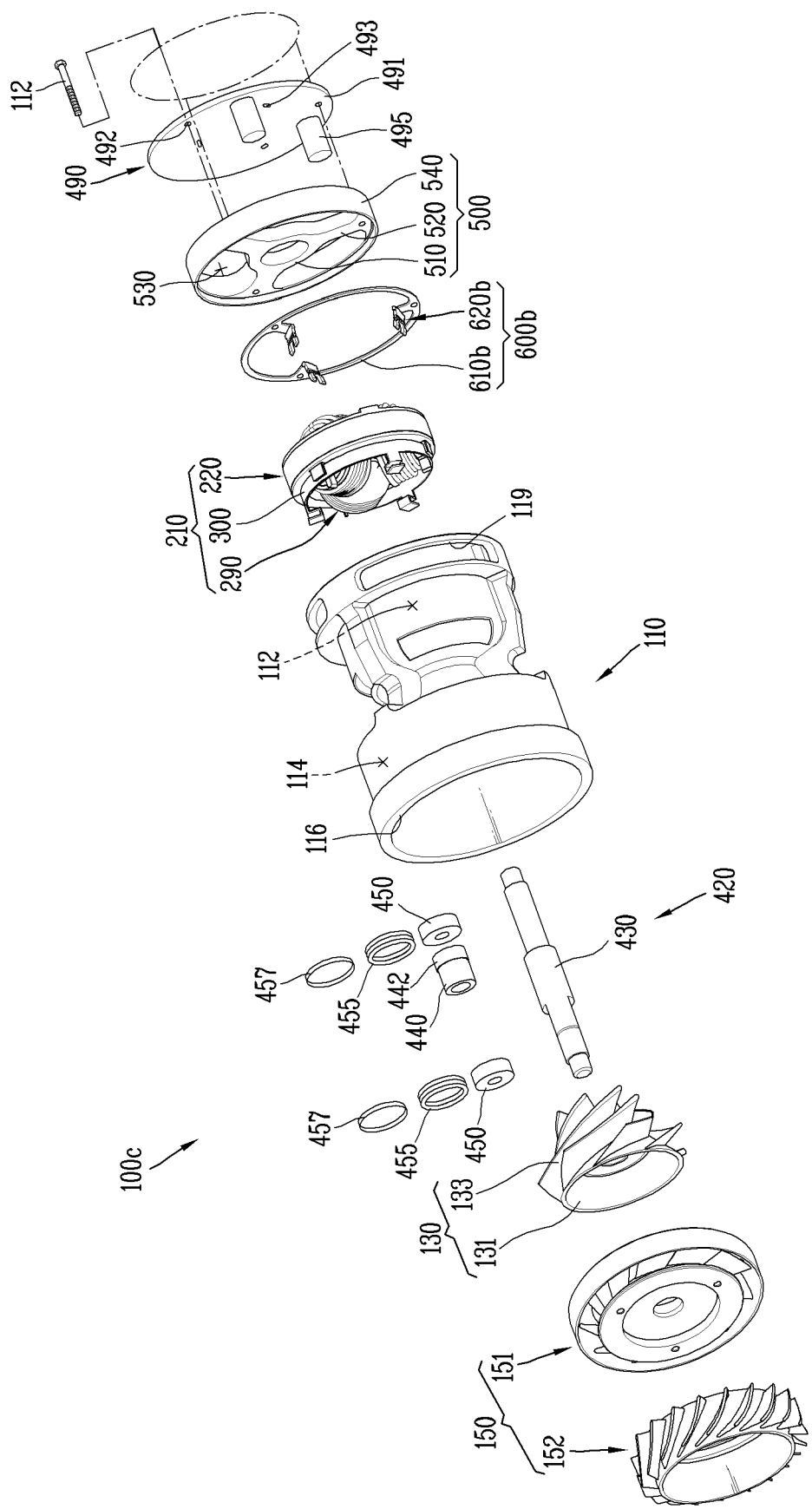
FIG. 20 is an exploded perspective view illustrating an example of an electric motor assembly.
Figure 21:
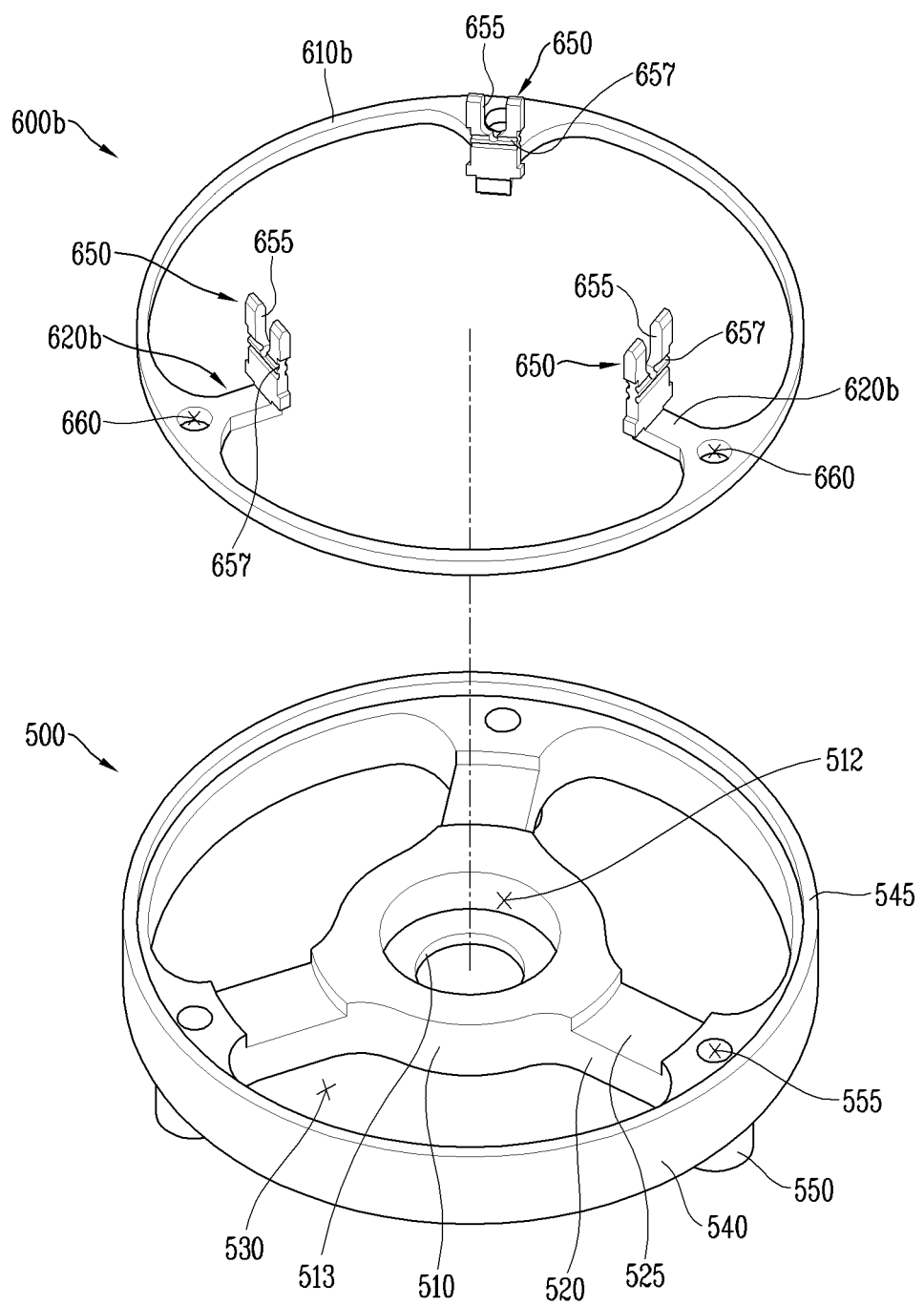
FIG. 21 is a perspective view illustrating an example state before coupling a connection ring and a bracket of FIG. 20.
Figure 22:
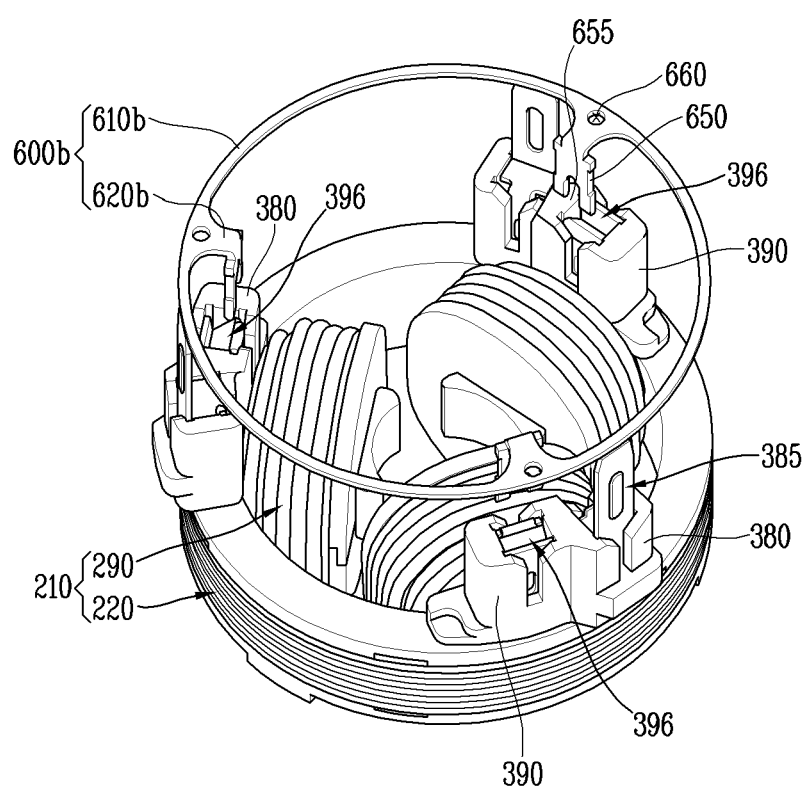
FIG. 22 is a view illustrating coupling of the connection ring and a stator of FIG. 20.

FIG. 20 is an exploded perspective view illustrating an example of an electric motor assembly, FIG. 21 is a perspective view before coupling a connection ring and a bracket of FIG. 20, and FIG. 22 is a view illustrating coupling of the connection ring and a stator of FIG. 20. As illustrated in FIG. 20, an electric motor assembly 100c can include the housing 110, the impeller 130, the stator 210, the rotor 420, the bracket 500, and a connection ring 600b.

The impeller 130 and the stator 210 can be provided inside the housing 110 to be spaced apart from each other in the axial direction.

The stator 210 can be disposed at an upstream side of the impeller 130 in a moving (flowing) direction of air that is moved when the impeller 130 rotates.

A guide vane 150 can be provided at one side of the impeller 130 inside the housing 110 to guide air passing through the impeller 130.

The stator 210 can include a stator core 220, a stator coil 290 wound around the stator core 220, and an insulator 300 provided between the stator core 220 and the stator coil 290.

The stator core 220 can include a yoke 230, and a plurality of teeth 250 radially coupled to the yoke 230.

The stator coil 290 can include, for example, a plurality of coil parts 291 wound around the plurality of teeth 250.

The rotor 420 can be rotatably accommodated in the stator 210.

The bracket 500 can be coupled to one end portion of the housing 110 in the axial direction.

A PCB 490 can be coupled to one side (lower side in the drawing) of the bracket 500 in the axial direction.

In some examples, the connection ring 600b for connecting neutral lines 294 of the stator coil 290 can be provided between the stator 210 and the bracket 500.

The connection ring 600b can be configured as an electric conductor.

The connection ring 600b can include a circular conductor 610, and a plurality of linear conductors 620a each having one side connected to the circular conductor 610 and another side connected to the corresponding coil part 291 of the stator coil 290.

The connection ring 600b can be in close contact with one side of the bracket 500.

The bracket 500 can include a bearing accommodating portion 510 in which a bearing 450 is accommodated, a plurality of spoke portions 520 radially extending from an outer surface of the bearing accommodating portion 510, and a rim 540 connecting end portions of the plurality of spoke portions 520.

A bearing accommodation space 512 can be recessed in the axial direction into the bearing accommodating portion 510. A through-hole 513 can be formed through one side (lower side in the drawing) of the bearing accommodation space 512 in the axial direction such that the bearing accommodation space 512 communicates with the outside.

The rim 540 can be configured, for example, to be concentrically arranged with the bearing accommodating portion 510.

The rim 540 can include a housing coupling portion 545 that is formed on one side thereof to more protrude in the axial direction than the bearing accommodating portion 510 and the plurality of spoke portions 520.

An end portion (i.e., the insertion portion 125) of the housing 110 can be inserted into the rim 540 (i.e., the housing coupling portion 545) by a preset depth.

The plurality of spoke portions 520 can include a plurality of fixing member coupling portions 555 formed therethrough in the axial direction, respectively, such that the fixing members 122 can be inserted in the axial direction. For instance, the fixing members 122 can include screws, bolts, rivets, pins, or the like.

The circular conductor 610b of the connection ring 600b can be disposed at an inner side of the rim 540, as illustrated in FIG. 21.

The connection ring 600b (i.e., the circular conductor 610b) can have an outer diameter which is the same as or smaller than an inner diameter of the rim 540.

The circular conductor 610b can have substantially the same inner diameter as the inner diameter of the rim 540.

In some implementations, the inner diameter of the circular conductor 610 can be slightly greater or slightly smaller than the inner diameter of the rim 540.

One end portion of each of the plurality of linear conductors 620b can be connected to an inner side of the circular conductor 610b.

Fixing member inserting portions 660 can be formed in connection areas between the circular conductor 610b and the plurality of linear conductors 620b, respectively, to correspond to the fixing member coupling portions 555 of the bracket 500.

The fixing member inserting portions 660 can be formed in a penetrating manner in the axial direction.

Each of the plurality of linear conductors 620b can protrude from an inner surface of the circular conductor 610b inward in the radial direction to have a predetermined length.

Each of the plurality of linear conductors 620b can be configured such that an end portion is disposed at one side of the recess portion 525 of the bracket 500.

Each of the plurality of linear conductors 620b can include a bent connection pin 650 bent from an end portion thereof in the axial direction.

The bent connection pin 650 can protrude in a direction away from the recess portion 525 of the bracket 500.

That is, each of the bent connection pins 650, as illustrated in FIG. 22, can protrude toward the neutral line connection part 390 of the stator 210.

The bent connection pin 650 can be inserted into the neutral line connection conductor 396 provided in the neutral line connection part 390 so as to be electrically connected.

With this configuration, the linear conductor 620a of each of the bent connection pins 650 can be deformable in the axial direction because one side of the linear conductor 620a is brought into contact with the bracket 500 by the recess portion 525 to be supported in a cantilever shape.

When the connection ring 600b is coupled to the neutral line connection parts 390, the connection ring 600b can be elastically supported by the elastic deformation of the linear conductors 620a, which are supported by the bracket 500 in the cantilever shape and can also be elastically coupled to the neutral line connection conductors 396.

Figure 23:
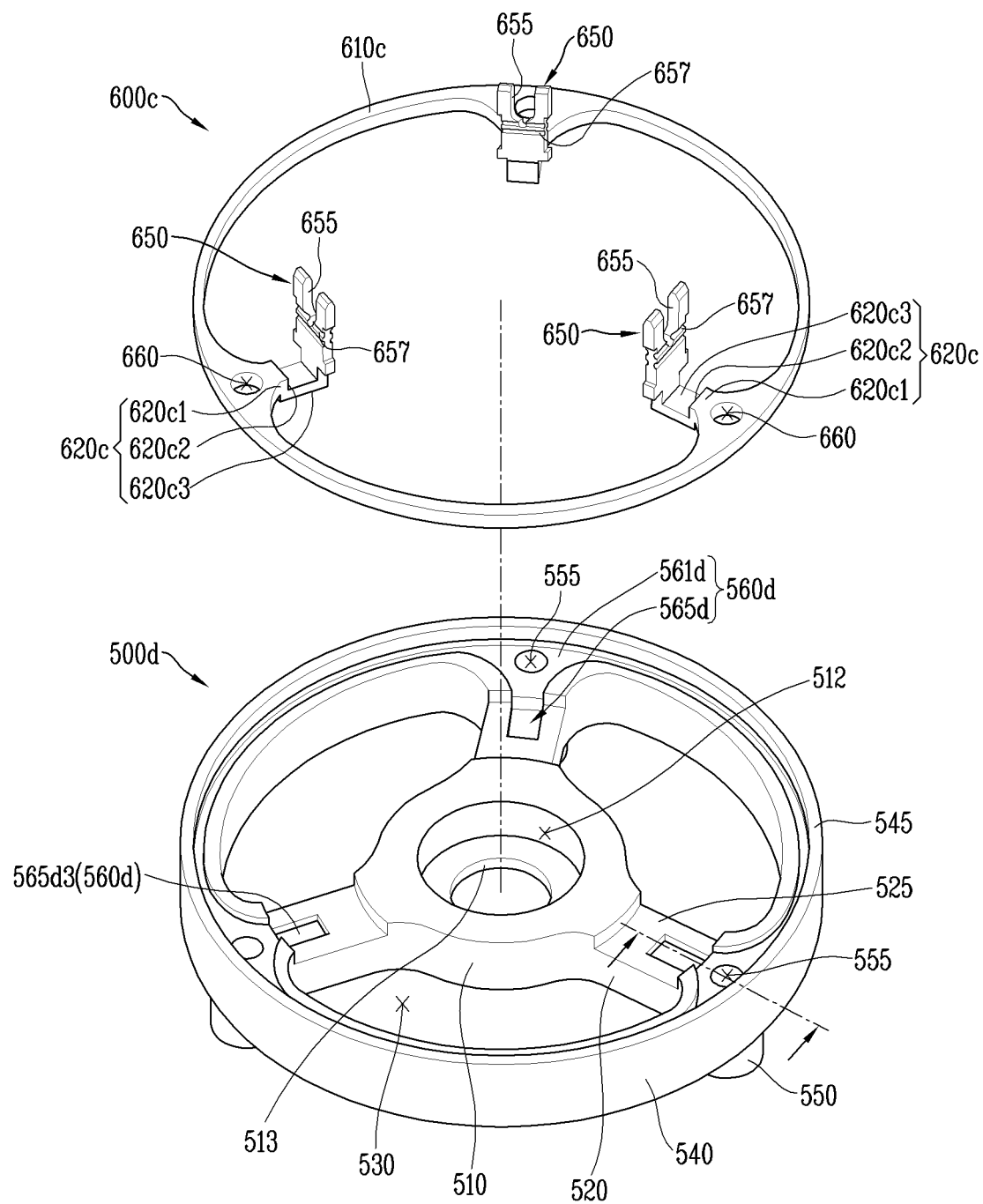
FIG. 23 is a perspective view illustrating an example state before coupling a connection ring and a bracket of an example of an electric motor assembly.
Figure 24:
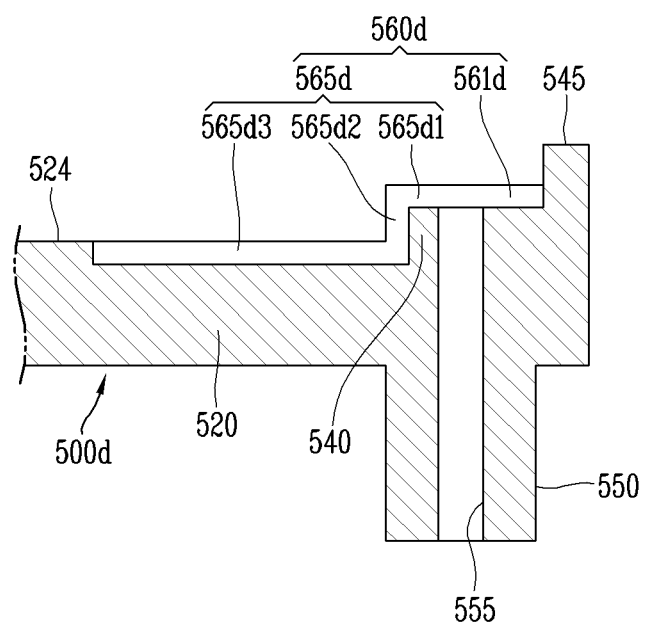
FIG. 24 is a cross-sectional view illustrating example parts of the bracket of FIG. 23.

FIG. 23 is a perspective view illustrating an example state before connecting a connection ring and a bracket of an electric motor assembly, and FIG. 24 is a cross-sectional view of a main part of the bracket of FIG. 23.

In some implementations, an electric motor assembly can include the housing 110, the impeller 130, the stator 210, the rotor 420, a bracket 500d, and a connection ring 600c.

The connection ring 600c can include, as illustrated in FIG. 23, a circular conductor 610c and a plurality of linear conductors 620c extending in the radial direction from an inner surface of the circular conductor 610c.

The plurality of linear conductors 620c can be recessed, for example, to correspond to recess portions 525 of the bracket 500d.

Each of the plurality of linear conductors 620c can include, for example, a first section 620c1 protruding radially from the inner surface of the circular conductor 610c, a bent section 620c2 bent from the first section 620c1 in the axial direction to correspond to the recess portion 525, and a second section 620c3 bent from the bent section 620c2 and extending in the radial direction.

Each of the plurality of linear conductors 620c can include a bent connection pin 650 bent and extending in the axial direction.

Each of the bent connection pins 650 can be bent from the second section 620c3 and extend in the axial direction.

The connection ring 600c can include fixing member inserting portions 660 formed therethrough in the axial direction such that fixing members 122 are inserted in the axial direction.

The fixing member inserting portions 660 can be formed in connection areas between the plurality of linear conductors 620c and the circular conductor 610c.

Each of the bent connection pins 650 can include a cutout portion 655 that is formed in an end portion thereof in a cutting manner along the axial direction such that the neutral line 294 is inserted.

Each of the bent connection pins 650 can include a stop portion 657 in which an end portion of the pressing portion 396b of the neutral line connection conductor 396 is accommodated.

In some implementations, the bracket 500d can include a bearing accommodating portion 510 in which a bearing 450 is accommodated, and a plurality of spoke portions 520 radially connected to an outer surface of the bearing accommodating portion 510.

A bearing accommodation space 512 can be recessed in the axial direction into the bearing accommodating portion 510. A through-hole 513 can be formed through one side (lower side in the drawing) of the bearing accommodation space 512 in the axial direction such that the bearing accommodation space 512 communicates with the outside.

The bracket 500d can include a rim 540 formed in a ring shape to connect outer end portions of the plurality of spoke portions 520.

The rim 540 can be configured, for example, to be concentrically arranged with the bearing accommodating portion 510.

The plurality of spoke portions 520 can include recess portions 525 recessed in the axial direction, respectively.

In some examples, the bracket 500d can include a connection ring accommodating portion 560d recessed in the axial direction to accommodate the connection ring 600c.

The connection ring accommodating portion 560d can include, as illustrated in FIG. 24, a circular conductor accommodating portion 561d recessed in an inner side of the rim 540 to extend along the rim 540 in the circumferential direction, and a plurality of linear conductor accommodating portions 565d extending from the circular conductor accommodating portion 561d in the radial direction.

Each of the plurality of linear conductor accommodating portions 565d can include a first section accommodating portion 565d1 to accommodate the first section, a bent section accommodating portion 565d2 extending from the first section accommodating portion 565d1 in the axial direction, and a second section accommodating portion 565d3 extending from the bent section accommodating portion 565d2 in the radial direction.

With this configuration, the connection ring 600c can be first coupled to the bracket 500d before being coupled to the neutral line connection parts 390.

That is, when the housing 110 and the bracket 500d are coupled to each other in a state that the connection ring 600c is accommodated in the connection ring accommodating portions 560d of the bracket 500d, the connection ring 600c can be naturally coupled to the neutral line connection parts 390.

Accordingly, the connection of the neutral lines 294 of the plurality of coil parts 291 can be quickly and easily performed by the connection ring 600c.

Figure 25:
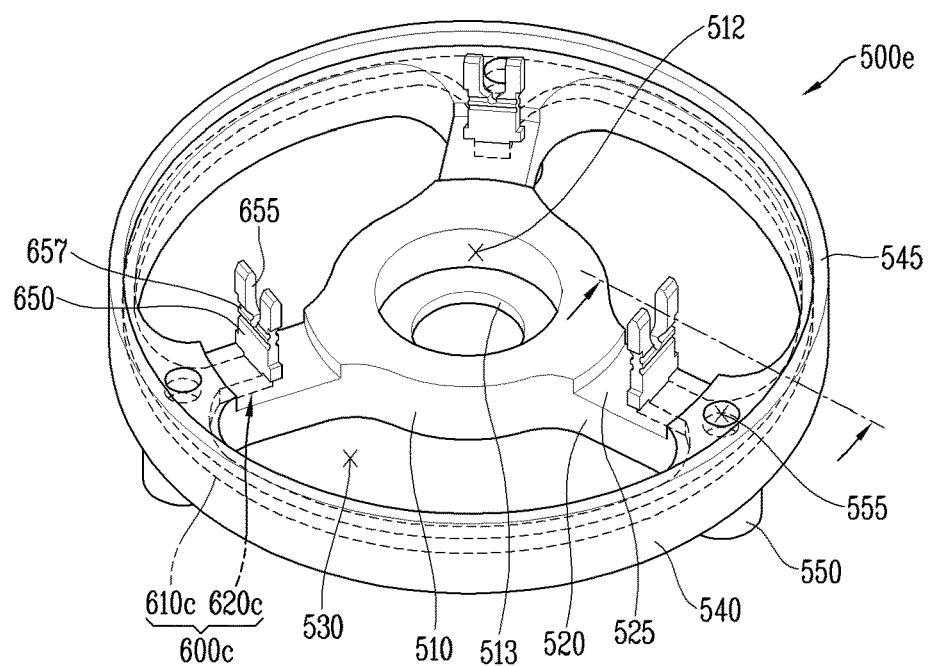
FIG. 25 is a perspective view illustrating an example of a connection ring and a bracket of an example of an electric motor assembly.
Figure 26:
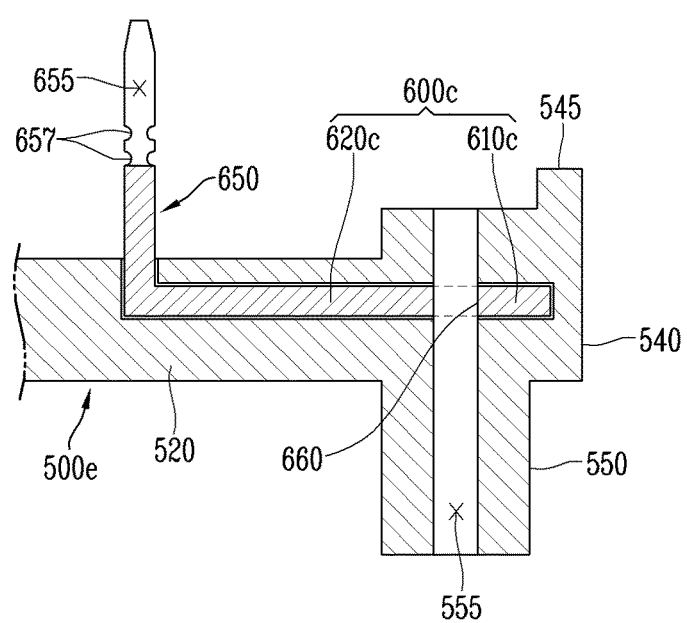
FIG. 26 is a cross-sectional view of a main part of FIG. 25.

FIG. 25 is a perspective view illustrating examples of a connection ring and a bracket of an example of an electric motor assembly, and FIG. 26 is a cross-sectional view illustrating example parts of FIG. 25.

In some implementations, an electric motor assembly can include the housing 110, the impeller 130, the stator 210, the rotor 420, a bracket 500e, and the connection ring 600c.

The connection ring 600c of the electric motor assembly can be configured to be embedded in the bracket 500e, as illustrated in FIG. 25.

The connection ring 600c can include, for example, a circular conductor 610c, and a plurality of linear conductors 620c each having one side connected to the circular conductor 610c and another side connected to the corresponding coil part 291.

The bracket 500e can include, for example, a bearing accommodating portion 510 in which a bearing 450 is accommodated, a plurality of spoke portions 520 radially connected to an outer surface of the bearing accommodating portion 510, and a rim 540 connecting outer end portions of the plurality of spoke portions 520.

A bearing accommodation space 512 can be recessed in the axial direction into the bearing accommodating portion 510. A through-hole 513 can be formed through one side (lower side in the drawing) of the bearing accommodation space 512 in the axial direction such that the bearing accommodation space 512 communicates with the outside.

The rim 540 can be configured, for example, to be concentrically arranged with the bearing accommodating portion 510.

The circular conductor 610c of the connection ring 600c can have a diameter corresponding to an inner diameter of the rim 540.

The circular conductor 610c can be disposed at an inner side of the rim 540 of the bracket 500e.

Each of the plurality of linear conductors 620c can extend from an inner surface of the circular conductor 610c in the radial direction.

The plurality of linear conductors 620c can be disposed inside the plurality of spoke portions 520, as illustrated in FIG. 26.

The connection ring 600c can include fixing member inserting portions 660 formed therethrough in the axial direction to correspond to the fixing member coupling portions 555 of the bracket 500e.

The connection ring 600c can include bent connection pins 650 protruding in the axial direction to be connected to the neutral line connection parts 390, respectively.

Each of the bent connection pins 650 can be bent from an end portion of the linear conductor 620c to protrude to the outside of the spoke portion 520 (recess portion 525).

Each of the bent connection pins 650 can include a cutout portion 655 formed therein such that the neutral line 294 of the coil part 291 can be inserted.

The cutout portion 655 can be formed by cutting an end portion of the bent connection pin 650 by a preset depth in the axial direction.

In some implementations, when the bracket 500e is coupled to the end portion of the housing 110, the bent connection pins 650 of the connection ring 600c which protrude from the bracket 500e in the axial direction can be naturally inserted into the neutral line connection parts 390, respectively.

Accordingly, the connection of the neutral lines 294 of the plurality of coil parts 291 can be made quickly and easily.

Figure 27:
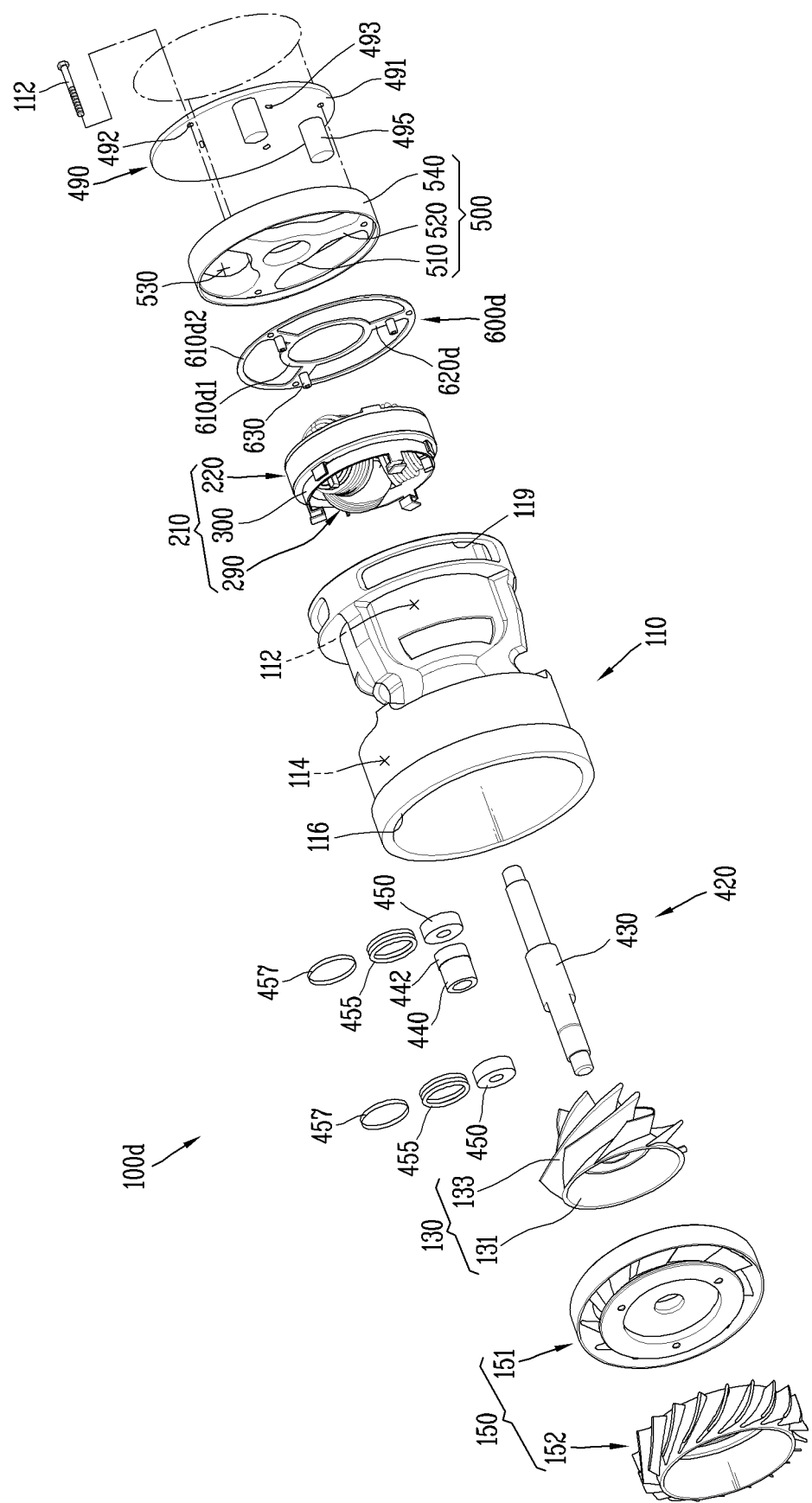
FIG. 27 is a perspective view illustrating an example state before coupling a connection ring and a bracket of an example of an electric motor assembly.
Figure 28:
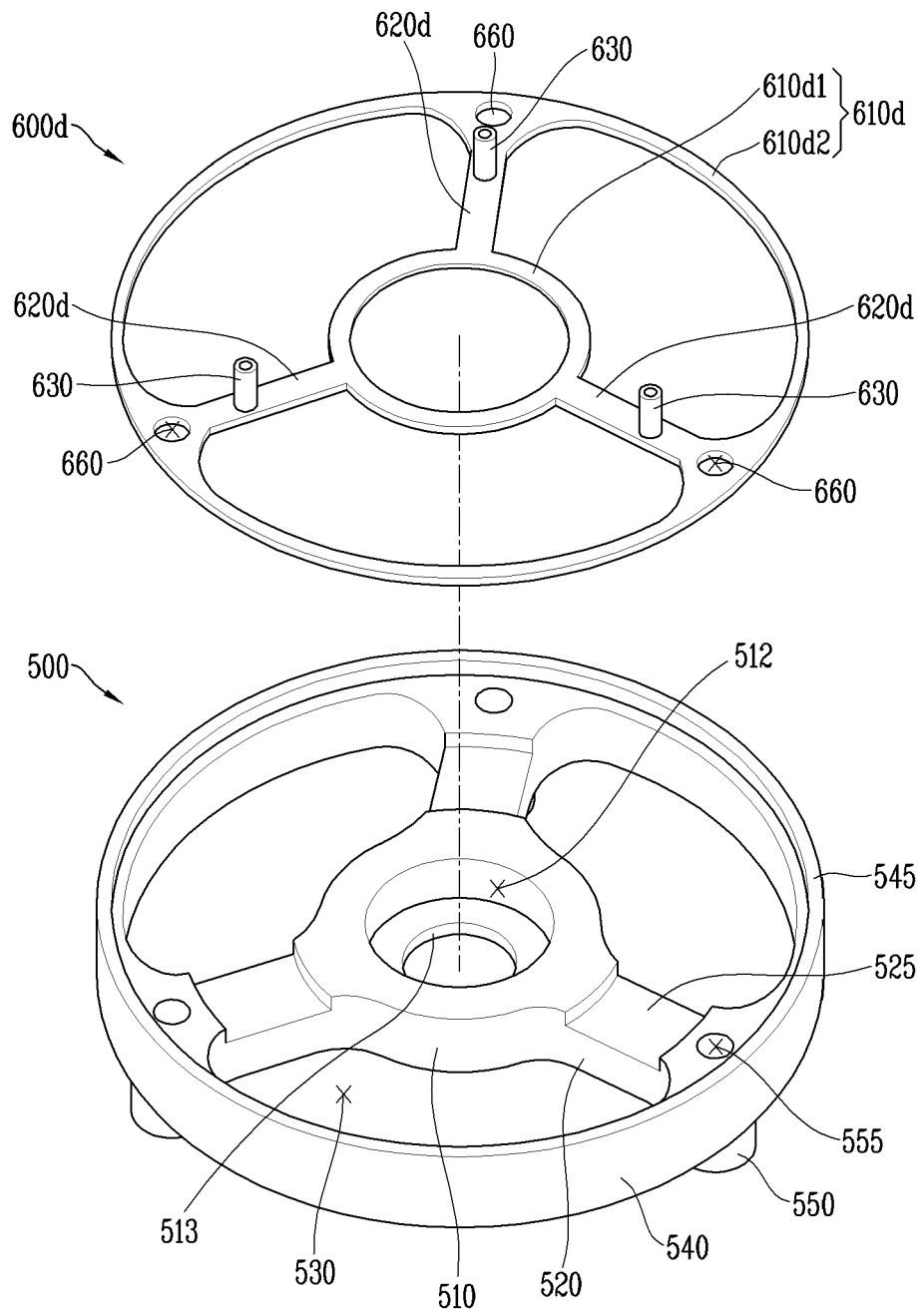
FIG. 28 is a perspective view illustrating an example state before coupling the connection ring and a bracket of FIG. 27.
Figure 29:
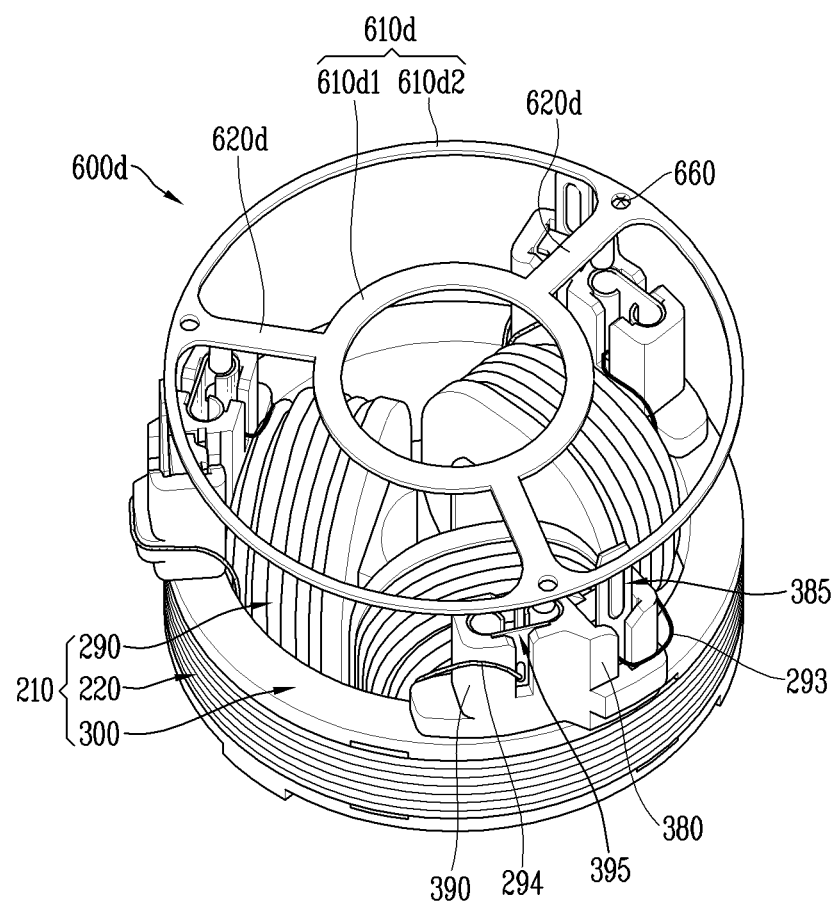
FIG. 29 is a view illustrating an example of coupling of the connection ring and a stator of FIG. 27.

FIG. 27 is a perspective view illustrating an example state before connecting a connection ring and a bracket of an electric motor assembly, FIG. 28 is a perspective view illustrating an example state before coupling the connection ring and the bracket of FIG. 27, and FIG. 29 is a view illustrating an example of a coupled state of the connection ring and a stator of FIG. 27.

In some implementations, an electric motor assembly 100d, as illustrated in FIG. 27, can include the housing 110, the impeller 130, the stator 210, the rotor 420, the bracket 500, and a connection ring 600d.

The impeller 130 and the stator 210 can be provided inside the housing 110.

The stator 210 can be disposed at an upstream side of the impeller 130 in a moving (flowing) direction of air that is moved when the impeller 130 rotates.

A guide vane 150 can be provided at one side of the impeller 130 in the axial direction to guide air moved by the impeller 130.

The rotor 420 can be rotatably accommodated in the stator 210.

The stator 210 can include a stator core 220, a stator coil 290 wound around the stator core 220, and an insulator 300 provided between the stator core 220 and the stator coil 290.

The stator core 220 can include, for example, a yoke 230 in a ring shape, and a plurality of teeth 250 radially coupled to an inner surface of the yoke 230.

The bracket 500 can be coupled to one end portion (lower end portion in the drawing) of the housing 110 in the axial direction.

A PCB 490 can be coupled to one side (lower side in the drawing) of the bracket 500 in the axial direction.

In some examples, the stator coil 290 can include a plurality of coil parts 291 wound around the plurality of teeth 250 in a concentrated winding manner.

The insulator 300 can include power line connection parts 380 to which power lines 293 of the plurality of coil parts 291 are connected.

The insulator 300 can include neutral line connection parts 390 each disposed at one side of the power line connection part 380 such that the neutral line 294 of the corresponding coil part 291 is connected.

The power line connection part 380 and the neutral line connection part 390 can be formed to protrude from the insulator 300 along the axial direction.

A connection ring 600d can be provided between the stator 210 and the bracket 500.

As illustrated in FIG. 28, the bracket 500 can include a bearing accommodating portion 510 in which a bearing 450 is accommodated, a plurality of spoke portions 520 extending radially from an outer surface of the bearing accommodating portion 510, and a rim 540 connecting outer end portions of the plurality of spoke portions 520.

A bearing accommodation space 512 can be recessed in the axial direction into the bearing accommodating portion 510. A through-hole 513 can be formed through one side (lower side in the drawing) of the bearing accommodation space 512 in the axial direction such that the bearing accommodation space 512 communicates with the outside.

The rim 540 can be configured, for example, to be concentrically arranged with the bearing accommodating portion 510.

The rim 540 can include a housing coupling portion 545 having one area more protruding in the axial direction than the bearing accommodating portion 510 and the plurality of spoke portions 520.

The bracket 500 can include a plurality of fixing member coupling portions 555 formed therethrough in the axial direction such that fixing members 122 are coupled.

The plurality of spoke portions 520 of the bracket 500 can include recess portions 525 recessed in the axial direction, respectively.

The connection ring 600*d* can include a circular conductor 610*d*, and a plurality of linear conductors 620*d* each having one side connected to the circular conductor 610*d* and another side connected to a neutral line 294 of the stator coil 290.

The circular conductor 610*d* can include, for example, an inner circular conductor 610*d*1 and an outer circular conductor 610*d*2 concentrically disposed with each other.

The inner circular conductor 610*d*1 can be disposed in the bearing accommodating portion 510.

The outer circular conductor 610*d*2 can be disposed at an inner side of the rim 540.

The connection ring 600*d* can include a plurality of fixing member inserting portions 660 formed therethrough such that fixing members 122 can be inserted.

The plurality of fixing member inserting portions 660 can be formed in boundary areas between the outer circular conductor 610*d*2 and the plurality of linear conductors 620*c*, respectively.

Each of the plurality of linear conductors 620*d* can include, as illustrated in FIG. 29, a connection pin 630 protruding therefrom in the axial direction to be coupled to the corresponding neutral line connection part 390.

The connection pin 630, for example, can have a circular cross section.

The connection pin 630 can have a cylindrical shape.

In some implementations, in the electric motor assembly 100*d*, when the yoke 230 of the stator core 220 and the plurality of teeth 250 are coupled completely, the connection ring 600*d* can be coupled to the neutral line connection parts 390. Each of the connection pins 630 of the connection ring 600*d* can be inserted into the connection pin accommodating portion 395*b* of the corresponding neutral line connection part 390.

The stator 210 and the rotor 420 can be accommodated in the housing 110 and the bracket 500 can be coupled to the lower end portion of the housing 110.

A PCB 490 can be coupled to one side of the bracket 500 and a PCB connection terminal 385 and the PCB 490 can be electrically connected to each other.

Figure 30:
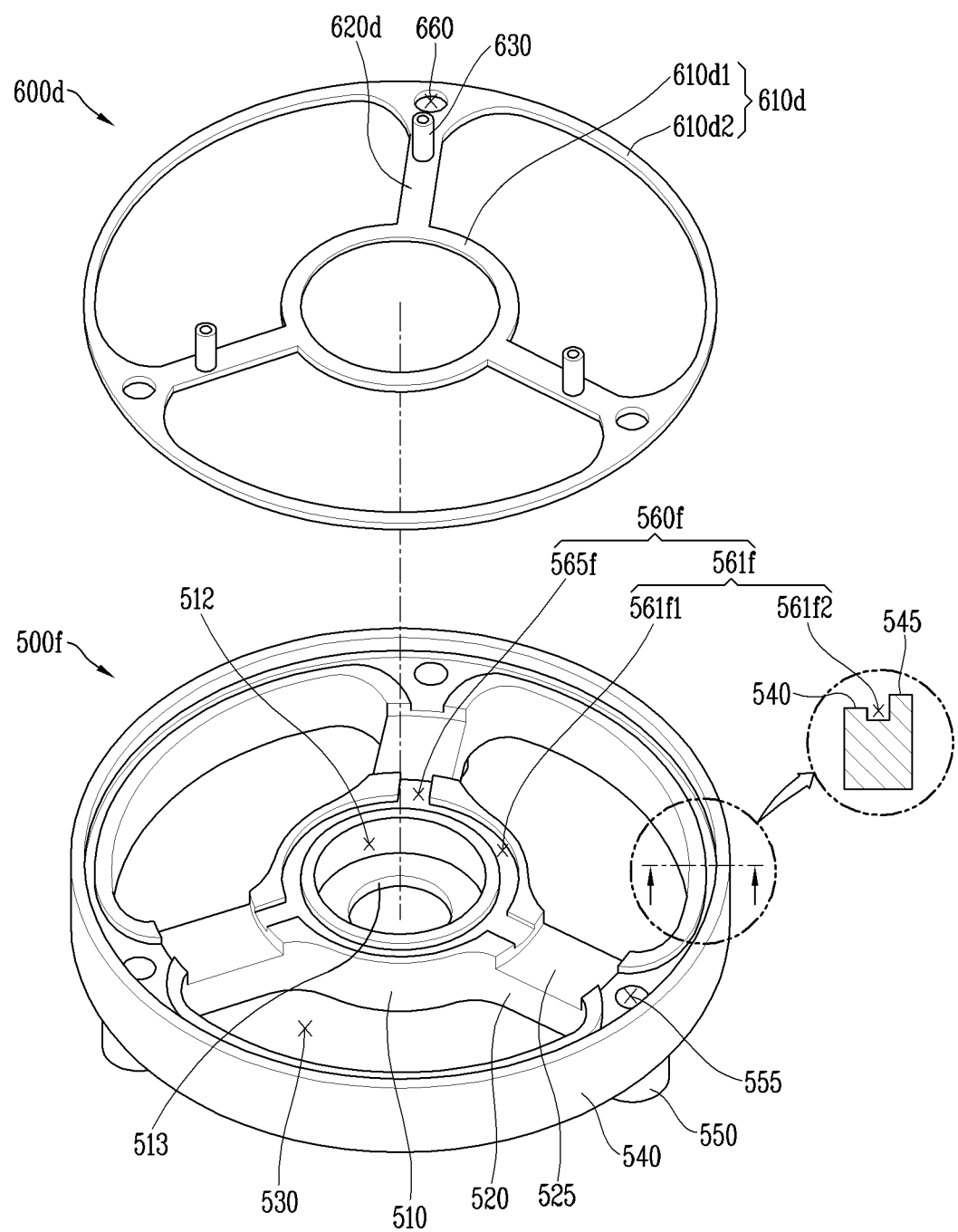
FIG. 30 is a perspective view illustrating an example state before coupling a connection ring and a bracket of an example of an electric motor assembly.

FIG. 30 is a perspective view illustrating an example state before coupling a connection ring and a bracket of an example of an electric motor assembly. The electric motor assembly can include the housing 110, the impeller 130, the stator 210, the rotor 420, a bracket 500*f*, and the connection ring 600*d*.

The bracket 500*f*, as illustrated in FIG. 30, can include a bearing accommodating portion 510 in which a bearing 450 is accommodated, a plurality of spoke portions 520 radially extending from an outer surface of the bearing accommodating portion 510, and a rim 540 connecting outer end portions of the plurality of spoke portions 520.

A bearing accommodation space 512 can be recessed in the axial direction into the bearing accommodating portion 510. A through-hole 513 can be formed through one side (lower side in the drawing) of the bearing accommodation space 512 in the axial direction such that the bearing accommodation space 512 communicates with the outside.

The rim 540 can be configured, for example, to be concentrically arranged with the bearing accommodating portion 510.

The connection ring 600*d* can include a circular conductor 610*d*, and a plurality of linear conductors 620*d* each having one side connected to the circular conductor 610*d* and another side connected to the neutral line 294 of the stator coil 290.

Each of the plurality of linear conductors 620*d* can include a connection pin 630 protruding therefrom along the axial direction to be inserted into the corresponding neutral line connection part 390.

The circular conductor 610*d* can include, for example, an inner circular conductor 610*d*1 and an outer circular conductor 610*d*2 concentrically disposed with each other. In some examples, the connection ring 600*d* can be inserted into the bracket 500*f*.

The bracket 500*f* can include a connection ring accommodating portion 560*f* recessed in the axial direction to accommodate the connection ring 600*d*.

The connection ring accommodating portion 560*f* can include a circular conductor accommodating portion 561*f* in which the circular conductor 610*d* is accommodated, and a plurality of linear conductor accommodating portions 565*f* in which the plurality of linear conductors 620*d* is accommodated.

The circular conductor accommodating portion 561*f* can include an inner circular conductor accommodating portion 561*f*1 in which the inner circular conductor 610*d*1 is accommodated, and an outer circular conductor accommodating portion 561*f*2 in which the outer circular conductor 610*d*2 is accommodated.

The outer circular conductor accommodating portion 561*f*2 can be recessed into the rim 540 of the bracket 500*f* in the axial direction.

In some implementations, the connection ring 600*d* can be first coupled to the bracket 500*f*.

When the bracket 500*f* is coupled to the lower end portion of the housing 110, the connection pins 630 of the connection ring 600*d* can be naturally inserted into the neutral line connection parts 390, respectively.

Accordingly, the connection of the neutral lines 294 of the plurality of coil parts 291 can be made quickly and easily.

Figure 31:
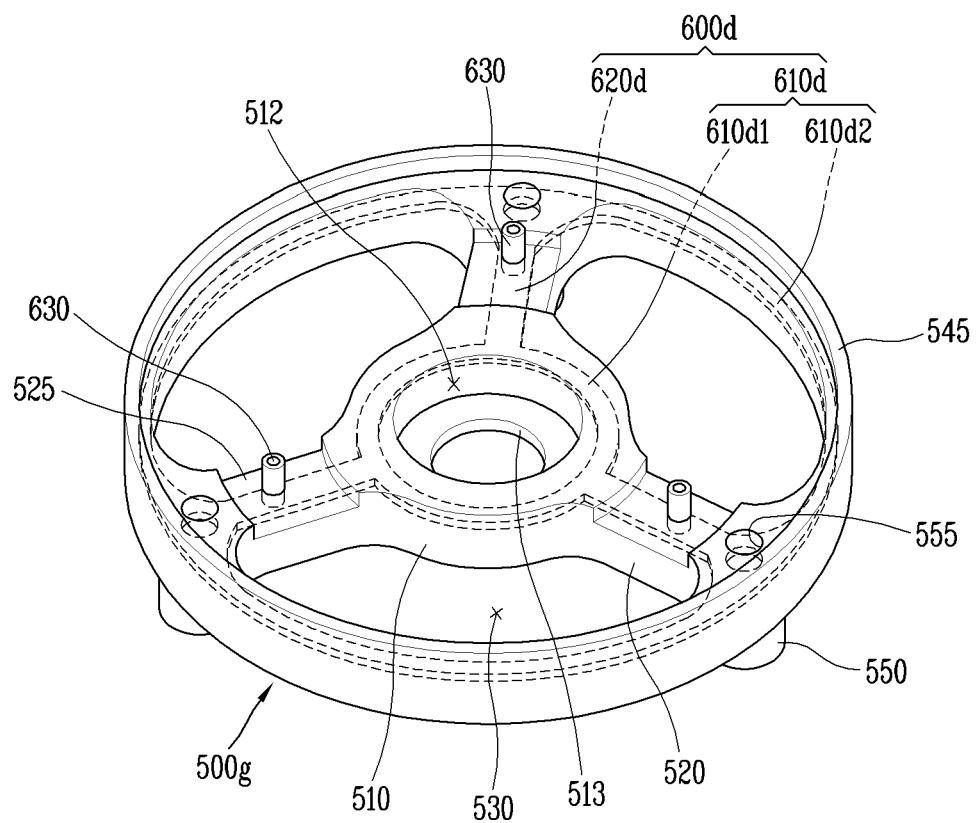
FIG. 31 is a perspective view illustrating examples of a connection ring and a bracket of an example of an electric motor assembly.
Figure 32:
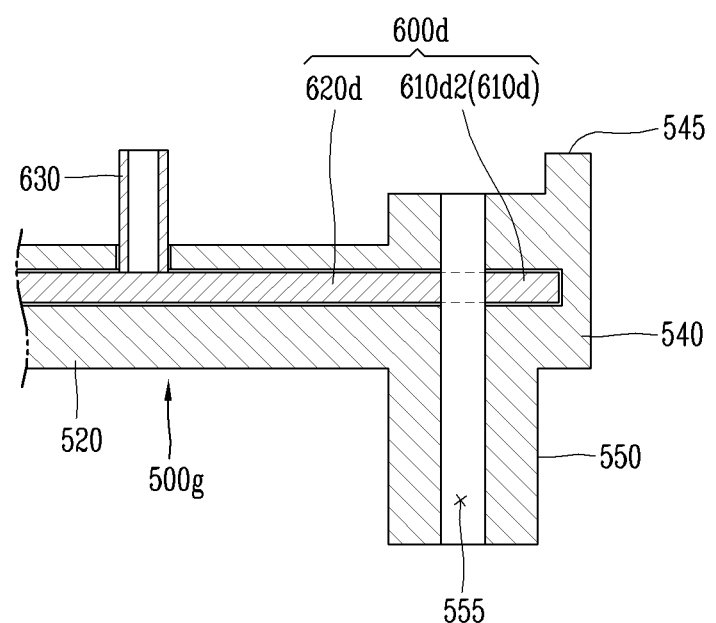
FIG. 32 is a cross-sectional view illustrating example parts of FIG. 31.

FIG. 31 is a perspective view illustrating examples of a connection ring and a bracket of an example of an electric motor assembly, and FIG. 32 is a cross-sectional view illustrating example parts of FIG. 31.

In some implementations, an electric motor assembly can include the housing 110, the impeller 130, the stator 210, the rotor 420, a bracket 500*g*, and the connection ring 600*d*.

The connection ring 600*d* of the electric motor assembly can be configured to be embedded in the bracket 500*g*, as illustrated in FIG. 31.

The bracket 500*g* can include a bearing accommodating portion 510 in which a bearing 450 is accommodated, a plurality of spoke portions 520 radially extending from an outer surface of the bearing accommodating portion 510, and a rim 540 connecting outer end portions of the plurality of spoke portions 520.

A bearing accommodation space 512 can be recessed in the axial direction into the bearing accommodating portion 510. A through-hole 513 can be formed through one side (lower side in the drawing) of the bearing accommodation space 512 in the axial direction such that the bearing accommodation space 512 communicates with the outside.

The rim 540 can be configured, for example, to be concentrically arranged with the bearing accommodating portion 510.

The connection ring 600*d* can include a circular conductor 610, and a plurality of linear conductors 620*d* each having one side connected to the circular conductor 610*d* and another side connected to the neutral line 294 of the stator coil 290.

Each of the plurality of linear conductors 620*d* can include a connection pin 630 protruding therefrom along the axial direction to be inserted into the corresponding neutral line connection part 390.

The circular conductor 610*d* can include, for example, an inner circular conductor 610*d*1 and an outer circular conductor 610*d*2 concentrically disposed with each other.

As illustrated in FIGS. 31 and 32, the inner circular conductor 610*d*1, the outer circular conductor 610*d*2, and the plurality of linear conductors 620 can all be disposed inside the bracket 500*g*, and each of the plurality of connection pins 630 can have one area exposed to the outside of the bracket 500*g*.

The connection ring 600*d* can include fixing member inserting portions 660 formed therethrough in the axial direction to communicate with fixing member coupling portions 555 of the bracket 500*g*.

In some examples, the stator 210 and the rotor 420 can be inserted into the housing 110 and the bracket 500*g* can be coupled to the lower end portion of the housing 110.

At this time, the plurality of connection pins 630 protruding from the bracket 500*g* in the axial direction can be inserted into the neutral line connection parts 390 of the stator 210, respectively.

Accordingly, the neutral lines 294 of the plurality of coil parts 291 of the stator coil 290 can be electrically connected together.

The foregoing description has been given of specific implementations of the present disclosure. However, the present disclosure can be implemented in various forms without departing from the essential characteristics, and thus the foregoing implementations should not be limited by the details of the detailed description.

It should be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electric motor assembly comprising:
a housing;
an impeller disposed inside the housing;
a stator disposed at one side of the impeller in an axial direction of the impeller, the stator comprising a plurality of coil parts and being located upstream relative to the impeller based on a moving direction of air moved by rotation of the impeller;
a rotor comprising a rotation shaft connected to the impeller, the rotor being configured to rotate relative to the stator;
a bracket that is coupled to the housing and supports the rotation shaft, the bracket being located upstream relative to the stator based on the moving direction of the air; and
a connection ring that is made of an electrical conductor and electrically connects together end portions of the plurality of coil parts,
wherein the bracket has a passing area configured to allow air to pass therethrough during rotation of the impeller and a non-passing area configured to block the air,
wherein the connection ring is disposed at the non-passing area of the bracket, and the bracket and the connection ring are arranged along the moving direction of the air,
wherein the connection ring is located downstream relative to the bracket based on the moving direction of the air,
wherein the connection ring comprises:
a circular conductor;
a plurality of linear conductors that connect the circular conductor to the plurality of coil parts, each of the plurality of linear conductors having a first side connected to the circular conductor and a second side connected to one of the plurality of coil parts, and
a plurality of connection pins that protrude from the plurality of linear conductors in the axial direction, respectively,
wherein the stator comprises:
a stator core,
a stator coil that is wound around the stator core, the stator coil including the plurality of coil parts, and
an insulator disposed between the stator core and the stator coil,
wherein the insulator comprises a plurality of neutral line connection parts, each of the plurality of neutral line connection parts being connected to one of the end portions of the plurality of coil parts and coupled to one of the connection pins, and
wherein each of the plurality of neutral line connection parts comprises a neutral line connection conductor that defines a connection pin accommodating portion having an arcuate shape with one open side, the neutral line connection conductor being in contact with one of the connection pins.

2. The electric motor assembly of claim 1, further comprising a bearing that is disposed at the bracket and supports the rotation shaft.

3. The electric motor assembly of claim 2,
wherein the circular conductor is disposed at a center of the plurality of linear conductors.

4. The electric motor assembly of claim 3, wherein the bracket comprises:
a bearing accommodating portion that receives the bearing, the circular conductor being disposed at the bearing accommodating portion; and
a plurality of spoke portions that are radially connected to an outer surface of the bearing accommodating portion, the plurality of linear conductors being disposed at the plurality of spoke portions, respectively.

5. The electric motor assembly of claim 4, wherein the bracket defines fixing member coupling portions coupled to fixing members in the axial direction, and
wherein each of the plurality of linear conductors defines a fixing member insertion portion that receives one of the fixing members.

6. The electric motor assembly of claim 1, wherein the bracket defines a connection ring accommodating portion that is recessed in the axial direction and receives the connection ring.

7. The electric motor assembly of claim 1, wherein the bracket is made of an injection molding material applied after the connection ring is inserted into a mold.

8. The electric motor assembly of claim 1, wherein the bracket defines a through hole in the passing area, the through hole being configured to draw air from an outside of the housing and provide the air toward the impeller sequentially through the bracket, the connection ring, and the stator.

9. An electric motor assembly comprising:
a housing;
an impeller disposed inside the housing;
a stator disposed at one side of the impeller in an axial direction of the impeller, the stator comprising a plurality of coil parts and being located upstream relative to the impeller based on a moving direction of air by rotation of the impeller;
a rotor comprising a rotation shaft connected to the impeller, the rotor being configured to rotate relative to the stator;
a bracket that is coupled to the housing and supports the rotation shaft, the bracket being located upstream relative to the stator based on the moving direction of the air;
a bearing that is disposed at the bracket and supports the rotation shaft; and
a connection ring that is made of an electric conductor and electrically connects together end portions of the plurality of coil parts,
wherein the bracket has a passing area configured to allow air to pass therethrough during rotation of the impeller and a non-passing area configured to block the air,
wherein the connection ring is disposed at the non-passing area of the bracket, and the bracket and the connection ring are arranged along a moving direction of the air,
wherein the connection ring is located downstream relative to the bracket based on the moving direction of the air, wherein the connection ring comprises:
a circular conductor, and
a plurality of linear conductors that are connected to an inner surface of the circular conductor, each of the plurality of linear conductors having a first side connected to the circular conductor and a second side connected to one of the plurality of coil parts,
wherein the circular conductor is disposed at outer sides of the plurality of linear conductors, and
wherein the bracket comprises:
a bearing accommodating portion that receives the bearing;
a plurality of spoke portions that extend from an outer surface of the bearing accommodating portion in a radial direction, the plurality of linear conductors being disposed at the plurality of spoke portions, respectively; and
a rim that connects end portions of the plurality of spoke portions, the circular conductor being disposed at the rim.

10. The electric motor assembly of claim 9, wherein the bracket defines fixing member coupling portions coupled to fixing members, and
wherein the connection ring defines fixing member insertion portions at boundary areas between the circular conductor and the plurality of linear conductors, each of the fixing member insertion portions facing one of the fixing member coupling portions.

11. An electric motor assembly comprising:
a housing;
an impeller disposed inside the housing;
a stator disposed at one side of the impeller in an axial direction of the impeller, the stator comprising a plurality of coil parts and being located upstream relative to the impeller based on a moving direction of air by rotation of the impeller;
a rotor comprising a rotation shaft connected to the impeller, the rotor being configured to rotate relative to the stator;
a bracket that is coupled to the housing and supports the rotation shaft, the bracket being located upstream relative to the stator based on the moving direction of the air;
a bearing that is disposed at the bracket and supports the rotation shaft; and
a connection ring that is made of an electric conductor and electrically connects together end portions of the plurality of coil parts,
wherein the connection ring comprises:
an inner circular conductor;
an outer circular conductor that is concentric with the inner circular conductor and spaced apart from the inner circular conductor in a radial direction; and
a plurality of linear conductors that radially extend from the inner circular conductor and are connected to the outer circular conductor, each of plurality of linear conductors having a first side connected to the inner circular conductor or the outer circular conductor and a second side connected to one of the plurality of coil parts, and wherein the bracket comprises:
a bearing accommodating portion that receives the bearing, the inner circular conductor being disposed at the bearing accommodating portion,
a plurality of spoke portions that extend in the radial direction from an outer surface of the bearing accommodating portion, and
a rim that connects together end portions of the plurality of spoke portions, the outer circular conductor being disposed at the rim.

12. The electric motor assembly of claim 11, wherein the bracket defines fixing member coupling portions coupled to fixing members and defined at boundary areas between the rim and the plurality of spoke portions of the bracket, and
wherein the connection ring defines fixing member inserting portions at boundary areas between the outer circular conductor and the plurality of linear conductors, each of the fixing member inserting portions facing one of the fixing member coupling portions.

13. An electric motor assembly comprising:
a housing;
an impeller disposed inside the housing;
a stator disposed at one side of the impeller in an axial direction of the impeller, the stator comprising a plurality of coil parts and being located upstream relative to the impeller based on a moving direction of air by rotation of the impeller;
a rotor comprising a rotation shaft connected to the impeller, the rotor being configured to rotate relative to the stator;
a bracket that is coupled to the housing and supports the rotation shaft, the bracket being located upstream relative to the stator based on the moving direction of the air; and
a connection ring that is made of an electric conductor and electrically connects together end portions of the plurality of coil parts,
wherein the bracket has a passing area configured to allow air to pass therethrough during rotation of the impeller and a non-passing area configured to block the air,
wherein the connection ring is disposed at the non-passing area of the bracket, and the bracket and the connection ring are arranged along a moving direction of the air,
wherein the connection ring is located downstream relative to the bracket based on the moving direction of the air, wherein the connection ring comprises:

a circular conductor;

a plurality of linear conductors that connect the circular conductor to the plurality of coil parts, each of the plurality of linear conductors having a first side connected to the circular conductor and a second side connected to one of the plurality of coil parts; and bent connection pins that are bent from ends of the plurality of linear conductors in the axial direction, respectively, each of the bent connection pins being connected to one of the plurality of coil parts wherein the stator comprises:

a stator core;

a stator coil that is wound around the stator core, the stator coil including the plurality of coil parts; and an insulator disposed between the stator core and the stator coil, and wherein the insulator comprises a plurality of neutral line connection parts, each of the plurality of neutral line connection parts being connected to one of the end portions of the plurality of coil parts and coupled to one of the bent connection pins.

14. The electric motor assembly of claim 13, wherein each of the neutral line connection parts comprises a neutral line connection conductor that connects one of the bent connection pins to one of the end portions of the plurality of coil parts, and wherein the neutral line connection conductor comprises:

a body having side wall portions that extend parallel to each other and receive a bent connection pin among the bent connection pins, and a pressing portion disposed at one of the side wall portions of the body and configured to press the bent connection pin inserted between the side wall portions to thereby bring the bent connection pin in contact with the other of the side wall portions of the body.

15. The electric motor assembly of claim 14, wherein the pressing portion extends from one of the side wall portions toward the other of the side wall portions and is inclined with respect to an insertion direction of the bent connection pin, and wherein the bent connection pin comprises a stop portion that is in contact with the pressing portion and configured to restrict separation of the bent connection pin from the neutral line connection conductor.

* * * * *